United States Patent [19]

Bouricius et al.

[11] 4,326,098
[45] Apr. 20, 1982

[54] HIGH SECURITY SYSTEM FOR ELECTRONIC SIGNATURE VERIFICATION

[75] Inventors: Willard G. Bouricius, Katonah, N.Y.; Horst Feistel, Lexington, Mass.

[73] Assignee: International Business Machines Corporation, Armonk, N.Y.

[21] Appl. No.: 165,455

[22] Filed: Jul. 2, 1980

[51] Int. Cl.³ .............................................. H04L 9/00
[52] U.S. Cl. ............................... 178/22.08; 235/380; 340/825.3; 178/22.09
[58] Field of Search .......................... 178/22.08, 22.09; 340/149 A, 149 R; 235/379, 380, 382

[56] References Cited

U.S. PATENT DOCUMENTS

| | | | |
|---|---|---|---|
| 3,798,605 | 3/1974 | Feistel ............................ | 178/22.08 |
| 4,223,403 | 9/1980 | Konheim et al. ................ | 178/22.08 |
| 4,264,782 | 4/1981 | Konheim ........................ | 178/22.08 |

*Primary Examiner*—Howard A. Birmiel
*Attorney, Agent, or Firm*—Roy R. Schlemmer, Jr.

[57] ABSTRACT

The system provides both electronic signature and message verification with a minimum of excess coding information on an instantaneous basis and is easily restartable in a store and forward environment. The system is based on the concept of a vault or central authority. The vault is in essence a physically secured Authenticator designed as a hardware automation which is not under control of any operating system. The system is a terminal based network wherein all terminals or users may communicate directly or through a central CPU. All secure electronic signature verification transactions must be transacted through the central facility which includes said vault. The vault and all terminals include an identical key-controlled block-cipher cryptographic facility wherein each user at a terminal has access only to his own key and wherein the vault has access to all user keys. At the end of a transaction, a user A (originator) and a user B (receiver) each have uniquely encrypted messages which can be utilized in later arbitration proceedings wherein user A cannot later deny having sent a message or its contents and similarly user B cannot deny having received the message or its specific content. The vault provides facilities for effective legal arbitration and is also simple to operate in such a n-to-n network without using more than one key per person.

14 Claims, 13 Drawing Figures

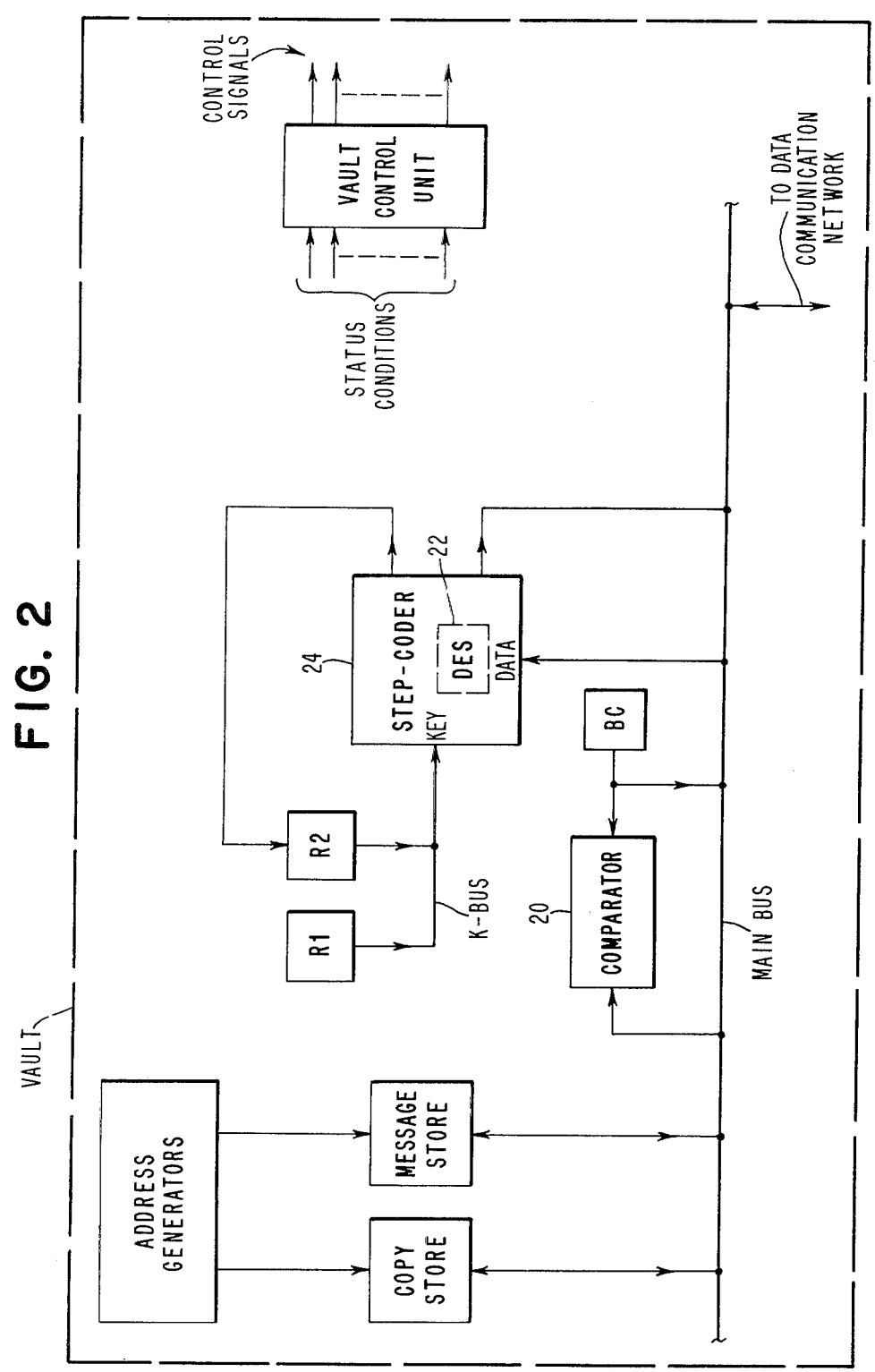

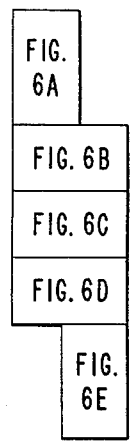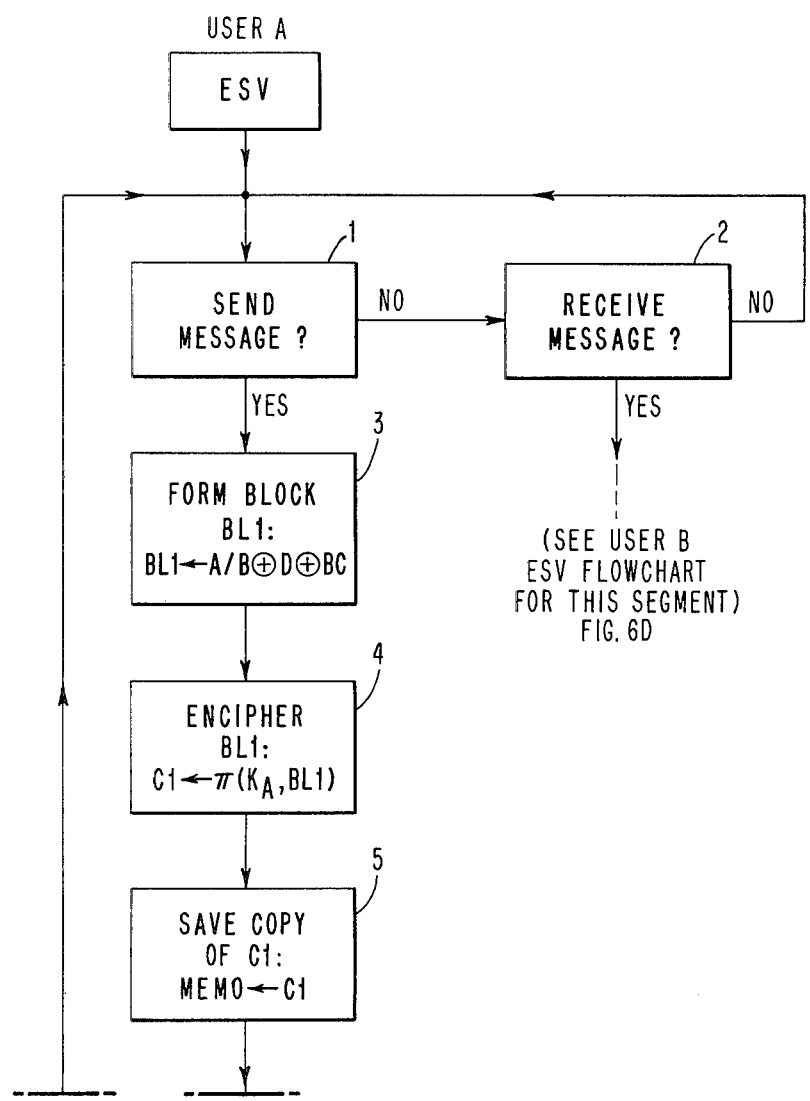
FIG. 6A

FIG. 7

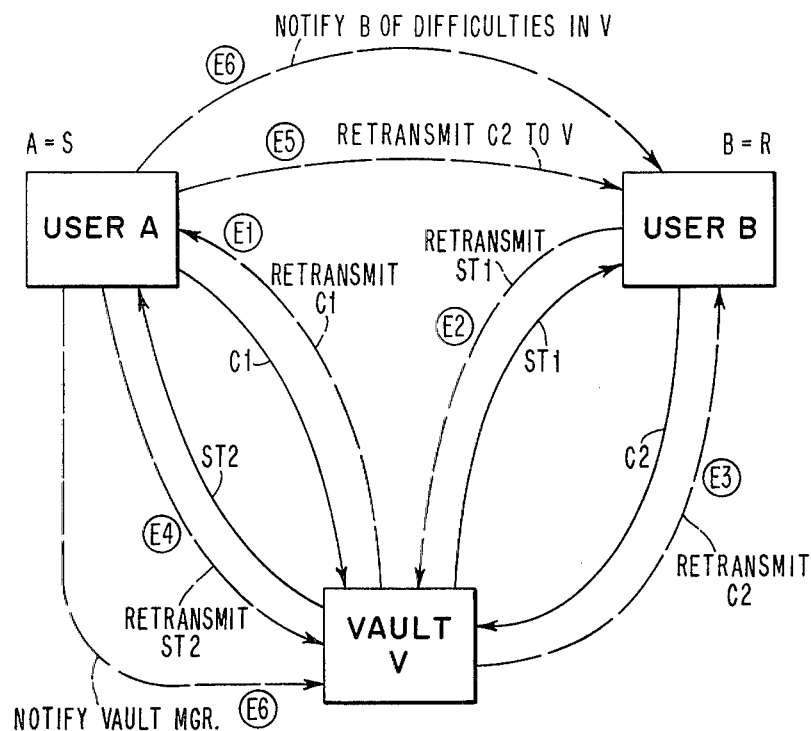

| ERROR CONDITION(S) | RECOVERY PROC. |
|---|---|
| C1 $\overline{\text{AUTH}}$ | E1: V REQUESTS A RETRANSMIT C1 |
| ST1 $\overline{\text{AUTH}}$ | E2: B REQUESTS V RETRANSMIT ST1 |
| C2 $\overline{\text{AUTH}}$ | E3: V REQUESTS B RETRANSMIT C2 |
| ST2 $\overline{\text{AUTH}}$ | E4: A REQUESTS V RETRANSMIT ST2 |
| C1 MATCH FAIL (W/ DIFF. ERRORS) | E5: A REQUESTS B RETRANSMIT C2 |
| C1 MATCH FAIL (W/ SAME ERROR) | E6: A NOTIFIES VAULT MGMT AND USER B OF DIFFICULTIES IN VAULT V |

(STEP-CIPHER-OPERATION)

HIGH SECURITY SYSTEM FOR ELECTRONIC SIGNATURE VERIFICATION

DESCRIPTION

1. Technical Field

Any Data Processing System which exposes important information to a wide public view must be protected as much as possible against operational interference of any conceivable type.

In Data Communications, such interference can, aside from wiretapping, take two forms: attempts to disrupt communications to prevent reception of intelligence, and attempts to corrupt, or to deceive legitimate operations into accepting false or obsolete information.

Traffic disruption is primarily a topic of interest to the military. Deception, however, is of great concern wherever one deals with automatic communications systems, as in computer controlled networks, funds transfer systems, or any other command and control system. This subject matter has thus become of major concern in many peace-time civilian applications.

It may be helpful to briefly illustrate the scenario of hostile threats in terms of a conceptual spectrum of possible interferences on a communications channel.

A first threat is by an opponent or "enemy" who wire taps or eaves-drops on a communication. He is completely passive, merely listens with a goal of obtaining information to which he is not entitled. Indeed, in most cases his opposite number, the "friend" may not even be aware of his presence.

The obvious countermeasure to mere "listening" is the classical role of cryptographic encipherment. It is well known that in this role cryptographic coding can be extremely effective.

Another threat is traffic corruption. Its countermeasure is Authentication. In the next section, efficient countermeasures will be described. Authentication must protect against all possible tricks of deception with very high safety margins. The trickery to be guarded against includes: random alteration of digits, reuse of recorded traffic when it is no longer valid, and cleverly designed but forged codes. It is not surprising that here too cryptographic coding appears as a natural tool, for Authentication may be regarded as "Cryptographically protected Error Detection." We observe that in the role of a "Corruptor", the enemy is no longer passive, but nevertheless in general not noticed as being active, at least not until the damage has been done.

A still further thread is "Disruption." In this role the foe no longer cares to remain in hiding, but actively disrupts communication by any (electronic) means available to him, including brute force signals. The topic of countermeasures to Communications Disruption is enormous in scope and known to the military as "Anti-Jamming." It is of lesser importance in non-military traffic, where one usually has the time to look for the intruder once his activity is known. Of interest here is merely the fact that cryptography has also an important role in Anti-Jamming.

Studying measures and countermeasures, it is shocking to notice that improvements offered to humanity by technology frequently bring along unpleasant side effects.

Those who observe such side effects before the designer recognizes their existence early enough to devise countermeasures can misuse them in a devastating manner.

With the contemplated large-scale use of cryptographic coding in many unforeseen peace-time applications, especially those involving computer controlled transactions (or communications) of financial, legal, medical, political, private or whatever nature, ever new concerns arise.

The more primitive means of communication are to some extent inherently authenticated; for instance, the personally known courier or the letter in a well-known handwriting. Use of an unknown courier, as in a large army, already brings with it an authentication problem, as indeed does use of a typewritten letter.

Already, in the past, rapid advances in communications techniques have often been accompanied by great successes in deception, because it was not realized in time that the new communications methods did not have the inherent authentication features of the old ones.

Currently, a great deal of interest is being focused on the so-called "Signature Verification" problem. Authentication in the accepted sense cannot guarantee that data transmitted has not been altered after reception nor can it guarantee that the originator might not eventually deny ever having transmitted it in the first place. Authentication can only guarantee that a transmission originated from a legitimate source. Authentication is a countermeasure against deception applied to transmission channels. What is now needed is an extension which also protects data against devious manipulations and considerations before and after transmission. The problem involves a curious mixture of legalistic and logical operations. In what follows the concept of a fully automatic system effecting this requirement in an efficient manner is presented.

A class of systems is described herein which provides a solution which requires a minimum of initial and subsequent administrative bulk and procedure. It is clear that a system capable of communicating signature information has to be one in which the sources of such information can be verified with very high safety margins as being legitimate. This means that the strongest possible authentication must play a central role.

A brief description will follow of a basic authentication system which, while adequate for some applications, is inadequate for others.

A communication network may be envisioned which comprises two typical members, Station "A" and Station "B" (Terminal) of a general n-to-n completely symmetrical communications network. The core of the network is a physically secured (concrete, armour plate, etc.) automaton, to be detailed later, called the "Vault."

A preliminary description of a typical vault is presented here. The Vault contains a mini or micro processor which cannot be controlled by any misused inside knowledge of such things as an Operating System. All information residing in said vault dissipates in principle with power failure. The automatic response of this device is strictly limited to process inputs of required format and produce specified outputs of a similar format. The required input format is such that it cannot be used to interrogate the workings of the vault in any manner useful to an illegitimate outsider—it merely processes the properly formatted input codes to a purposefully, very restricted output.

In this proposed system, all stations are assigned a randomly selected key. Station A or participant A uses key $K_A$, Station B has key $K_B$, etc. These keys are known only to their particular owners except that they are also stored perhaps in enciphered form under the owner's name in the vault. The encipherment of the keys is effected within the system under a special key $K^*$ known only to a trustee. $K^*$ could consist of the sum mod 2 of several, independent trustee-keys. In this case $K^*$ would still be safe even if all but one trustee proves corruptible.

The vault also contains a binary clock BC, which might indicate data and time of day with suitable precision and tolerance, depending strongly on the application.

All member stations have an identical clock BC and all clocks are synchronized at a suitable starting time over the network.

If A wishes to communicate data D to station B, terminal A will automatically catenate digit block D to digit block BC and block S/R designating the addresses of the sender and receiver, forming block BL1. BL1 is enciphered by the system using key $K_A$, forming cipher-block C1.

C1 is then preceded by the address A of the sender (in the clear) and transmitted to the vault V.

Upon reception of C1, the vault looks up the enciphered key of station A, deciphers this information, obtaining key $K_A$. $K_A$ is subsequently used to decipher C1 and then $K_A$ is destroyed.

The Vault now has the clear text BL1 and can hence check BC received against his local time BC. If both match within the agreed tolerances (determined by transmission distances and switching operations, etc.). The Vault will know the communication C1 must have originated from a legitimate source A. Station A has now been authenticated. The degree of authenticity of the data is simply determined by the dimension of digit block BC. Each digit in BC contributes one bit of authentication information. It is not possible to authenticate more efficiently.

The Vault now reads the address of the intended receiver B contained in S/R, and establishes key $K_B$ in the same manner as it did $K_A$. It then composes a new block BL2 consisting of S/R the data D, and a new time count BC representing the current time at the Vault. This block BL2 is enciphered using key $K_B$. The resulting cipher C2 is transmitted to B.

Upon reception B deciphers C2 using his personal key $K_B$, obtaining (in the absence of interference) Data D and BC and S.

At this point B cannot be sure that this information (BL2) is of legitimate origin.

B now reads his time-count BC and matches it against BC received. If both counts check to within a reasonable tolerance, his terminal decoder will open gate G and accept data D as being of legitimate origin. Data D have now been authenticated.

Nevertheless, in case of a controversy, A could still deny ever having sent C1 and B could deny ever having received C2. We observe, for example, that B would well know in this situation that A is lying, but B could not legally prove this behavior.

A concept which can provide effective protection against what one might call signature falsification is presented in the Disclosure of Invention section, which concept forms the basis of the present electronic signature verification system.

2. Background Art

The following publications all relate to various types of electronic or digital signature systems generally using various types of approaches to achieve data and/or message integrity. The systems disclosed in these publications differ considerably in both approach and results to the system disclosed herein. (1) M. O. Rabin, "Signature and Certification by Coding," IBM Technical Disclosure Bulletin, Vol. 20, No. 8, pp. 3337-8, (January 1978). (2) W. Diffie, M. Hellman, "New Directions in Cryptography," IEEE Trans. on Information Theory (November 1976). (3) R. L. Rivest, A. Shamir and L. Adleman, "On Digital Signatures and Public-Key Crypto-Systems," M.I.T. Laboratory for Computer Science Report, MIT/LCS/TM-82 (April 1977).

The presently disclosed system utilizes a key-controlled block-cipher cryptographic system referred to hereinafter as DES and in the formulas and drawings by the symbol $\pi$. A preferred embodiment of such an encryption device is set forth in the National Bureau of Standards Federal Information processing standard entitled, "Encryption Algorithm for Computer Data Protection." The standard together with a complete technical description is contained in the publication, "Data Encryption Standard," Federal Information Processing Standard (FIPS), Publication 46, National Bureau of Standards, U.S. Department of Commerce (January 1977). While other key-controlled block-cipher cryptographic systems could be utilized in the invention, the above-references system is preferred.

For a description of the operation of a typical block-cipher cryptographic system, reference is hereby made to U.S. Pat. No. 3,798,359 entitled, "Block-Cipher Cryptographic System", U.S. Pat. No. 3,796,830, entitled, "Recirculating Block-Cipher Cryptographic System"; all assigned to the same assignee as the present application. These patents generally describe the concepts involved with sophisticated, Key-Controlled Block-Cipher Cryptographic Systems currently known in the art. The later U.S. Pat. No. 3,958,081 relates to a specific implementation of such a Block-Cipher Cryptographic System and much more particularly, a Cryptographic System which conforms to the previously specified Federal Information Processing Standard currently in effect in the procurement regulations of the U.S. Government.

The present system uses a step coding technique which is very similar to data chaining. For a description of a data chaining system, reference is made to U.S. Pat. No. 4,078,152 of L. B. Tuckerman, entitled "Block-Cipher Cryptographic System with Chaining."

BRIEF DESCRIPTION OF THE DRAWINGS

FIG. 1.2 is a combination functional block diagram and flow chart illustrating the principles of the present invention.

FIG. 6 comprises an organizational drawing for FIGS. 6A through 6E.

FIGS. 6A through 6E comprise a system flow chart for the various operations which occur in two communicating terminals A and B and the Vault Unit.

FIG. 7 is a diagram illustrating all of the communication messages required of a normal verification transaction and also illustrates various messages which would be sent in the event of 'error conditions' being detected.

DISCLOSURE OF INVENTION

The basic difficulty in the relationship between A and B in the authentication scheme described previously in the Technical Field section arises from the fact that although B knows when he receives a communication from A that indeed it came from A, he can always alter the decoded message and later claim that the forged message was what he received. A, knowing that this possibility exists, could equally well, if it suits him later on, deny ever having sent a message to B or claim that B altered it after reception, even if B is innocent.

The problem is quite apparently not one of interference on the transmission channel, but one of document administration. Means are required by which information transmitted and received can be certified and checked as being of certified origin, even at any later data long after the time of reception, i.e., after the operation of "the System".

This can be accomplished by modifying the process described previously.

The message BL1 is prepared by A as before. The communications process operates as before, with the following basic difference. After deciphering C1 and authenticating it as having indeed originated with A the Vault will now provide a copy of the unaltered cipher C1 to receiver B along with cipher C2.

The decisive step here is that B will receive two pieces of information: Cipher C2 which he can read since the Vault enciphered it in his key $K_B$, and cipher C1 which the Vault guarantees as being the authenticated original from A. B now has a copy of C1, which can, in case of a disagreement, be deciphered in front of a legal arbiter. A cannot change his mind after he transmits C1 since the Vault can automatically certify emanation of C1 from A.

Here it is noted that B cannot read C1 since he does not have $K_A$. Before the complete protocol shown in FIG. 1B is presented which includes protection against deception by B, it is necessary to give a more detailed description of the method of transmitting C1 and C2 to B along with more detail on the inner structure of the Vault.

Step Coding Operation

Step Codes are useful not only to encipher messages of varying lengths, but also to bundle individual message blocks functionally together into one new block. The resulting intersymbol dependence is a very powerful ingredient of authentication. This technique is described elsewhere as 'chaining'.

It will be remembered that in the Basic Signature Verification System, described previously, the Vault simply transmitted blocks C1 and C2 as individuals to B. An opponent (e.g., and ally of A) could possibly seize on this and corrupt C1 during transmission, leaving C2 alone. B could not notice this, unless special precautions are taken.

Figure 8:
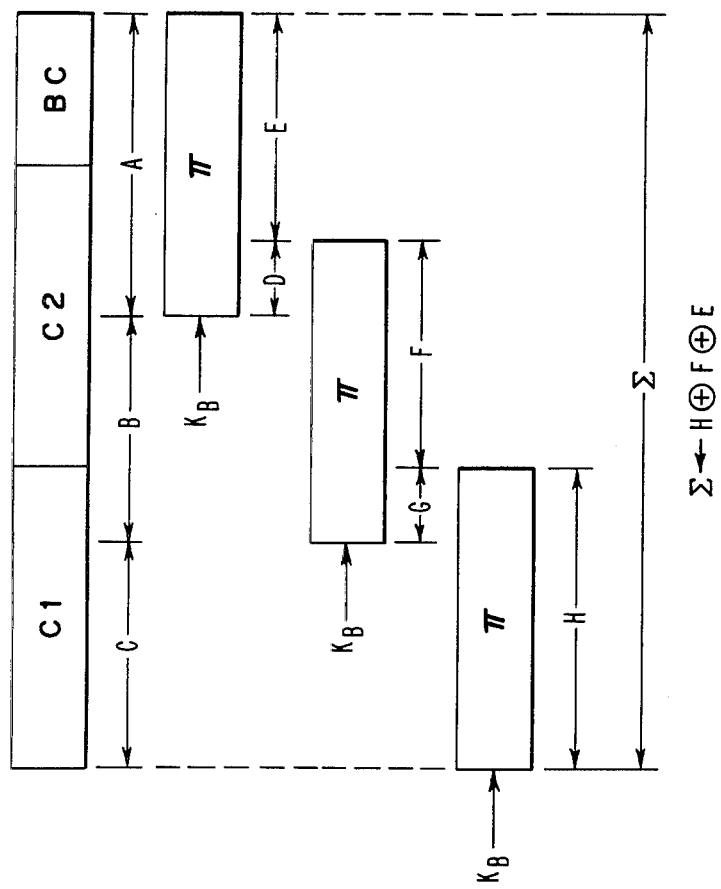
FIG. 8 comprises a schematic illustration of the step-coding operation.

To protect against such selective corruption of ciphers C1 and C2 a Coding technique, is devised for this application called STEP-CODING. This is illustrated in FIG. 8.

A step code refers simply to the step-wise manner in which the desired catenated blocks are enciphered by a block cipher $\pi$, of length smaller than the catenated blocks. In FIG. 8 blocks C1, C2 and the authenticator BC are to be enciphered into one single block $\Sigma$. This is effected by first taking block A of length d and enciphering it with block-system $\pi$, resulting in block D and E. The system is now displaced by a suitable number of digit positions, to encipher blocks B and D. B and D together have again length d. The result of this encipherment are blocks G and F.

The next step then is to encipher blocks C and G, resulting in block H.

The cipher is then defined as $$\Sigma = H \oplus F \oplus E.$$

We also note that in FIG. 8

$$D \oplus E = \pi(K_B, A)$$

$$G \oplus F = \pi(K_B, B \oplus D)$$

$$H = \pi(K_B, C \oplus G)$$

where the notation $$\pi(K, D)$$

denotes the encipherment or encryption of data D with key K using Crpto System $\pi$, and where the notation $\Sigma(K, D)$ denotes the step encryption or encipherment of data D with Key K making use of the $\pi$ Crypto System. By $\pi^{-1}$ or $\Sigma^{-1}$ we denote the decryption or deciphering process.

It will be observed that having placed the authenticator BC at the right hand side, any interference or alteration of even a single digit position in any part of $\Sigma$ will with any desired probability affect BC. The system can thus detect any attempt at corrupting the underlying data text. The receiver, upon deciphering with a step coder and establishing its source as being authentic, can be satisfied that both blocks C1 and C2, as decoded, are uncontaminated and thus suitable for further verification purposes. It is impossible for B to receive one of the blocks C1 or C2 uncorrupted and the other one in contaminated form, as long as the step code properly authenticates.

It should be clearly understood, however, that the step encipherment operations are improvements over the basic system concept and that the system would operate quite satisfactorily if the messages were processed using straightforward encipherment under $K_B$ and $K_A$.

The Vault

The facility called the "Vault" plays a decisive role in the present system and its function will now be described.

One of the principal features of this automaton (e.g. microprocessor) is, of course, that it contains the key information of all the members of the net under physical security.

To safeguard this vital information it is assumed that the storage is volatile in the sense that this information will be completely wiped out in case of any attempt at tampering (or power-failure).

There are many ways of entering key-listings. One might just store the names of the members and their respective keys in the clear, justifying this in view of the assumption of physical security.

This method would have the disadvantage that all keys would be lost in case of power failure.

A better way would be to store all keys external to the vault in enciphered form. The encryption process would use a special trustee-key $K^*$, available only to selected personnel but not to any ordinary member.

The key list would then contain the names of all members along with the special encipherment of the key assigned to them.

Thus A would have his enciphered key listed as $\pi(K^*, K_B)$, etc.

This method has the advantage that in case of loss of the key list (say through power-failure) within the Vault, the key information could be reloaded from the outside, e.g., from disc-storage. Such external reserve storage is here safe since all keys are enciphered. Reinitialization would only require the manual entry of $K^*$, or the K's making up the $K^*$.

The operation of the Vault using a still different method of key listing, will now be described.

It is assumed that the key for each member will be generated within the Vault when needed, by enciphering the name of the member with the special key $K^*$.

The key for member A would thus be: $\pi(K^*, A(\text{name}))$ and for member B: $\pi(K^*, B(\text{name}))$.

Keys could easily be changed on an individual basis if each member selected at will a suitable order number to be catenated to his name before encipherment with $K^*$. Thus member A could ask for a new key number "16", which the Vault would generate as $\pi(A \oplus 16), K^*$. However, such detail is of no consequence for the conceptual function of the Vault and we shall use only the basic concept of local key generation. The information flow through the Vault would be as follows.

Member A desiring to communicate with member B would transmit C1 (as explained before) along with his name A in the clear to the Vault.

Upon receipt of the message C1 is separated from A and A along with $K^*$ is supplied to the DES (see block 22 of FIG. 2) to generate A's key $K_A$. $K_A$ is next supplied to the DES box which has meanwhile been furnished with C1. Having both C1 and $K_A$, the DES $\pi^{-1}$ deciphers C1, obtaining S/R (the sender-receiver info) the data D and BC. BC is checked in comparator (20 in FIG. 2) against the local BC. If the match is satisfactory, the system controls will accept S/R, data D, and the copy of C1 since their origin has now been authenticated as being from A. All this information is now suitable to be used for certification.

The system now separates the two components of the vector S/R and establishes S as being A and R as being B.

The name B is now routed back to the DES (block 22, FIG. 2) or $\pi$ encrypter where B and $K^*$ are used to generate $K_B$.

Next the key $K_B$ is supplied to the Step-Coder, which includes the DES. It will be noted in FIG. 2 that although the DES box is shown inside the Step-Coder, it is nevertheless available to the system to perform ordinary encipherment/decipherment functions.

The Step-Coder now step enciphers the Copy of C1, along with the catenations of D, A, and the BC now valid, with key $K_B$.

The Step enciphered message ST1 has now been formed and is conveyed to B.

It is crucial to recapitulate that ST1 will furnish B with a step code enciphered in $K_B$, so that B can:
1. Find a copy of C1 certified by V as having originated with A.
2. Determine the clear text content of C1 as authenticated and furnished by V.
3. Have a new authenticator BC which is BC updated to location V.

BC, as part of the step-code, guarantees, within the accepted tolerances, that both C1 and D are uncontaminated and that they would not have been transmitted and reenciphered by V unless the address A was the authentic source of C1.

The operation of the Vault has just been generally described with respect to the operations therein as a result of the first sequence of communication, i.e., A to V and then V to B. The operation in the reverse direction would be substantially the same, i.e., B to V with C2 and V to A with ST2.

The Complete Signature Verification Loop

The complete Signature Verification Loop of the present invention will now be described primarily with reference to FIG. 1.2 which is a combination functional block diagram and system data flow chart.

Figure 1:
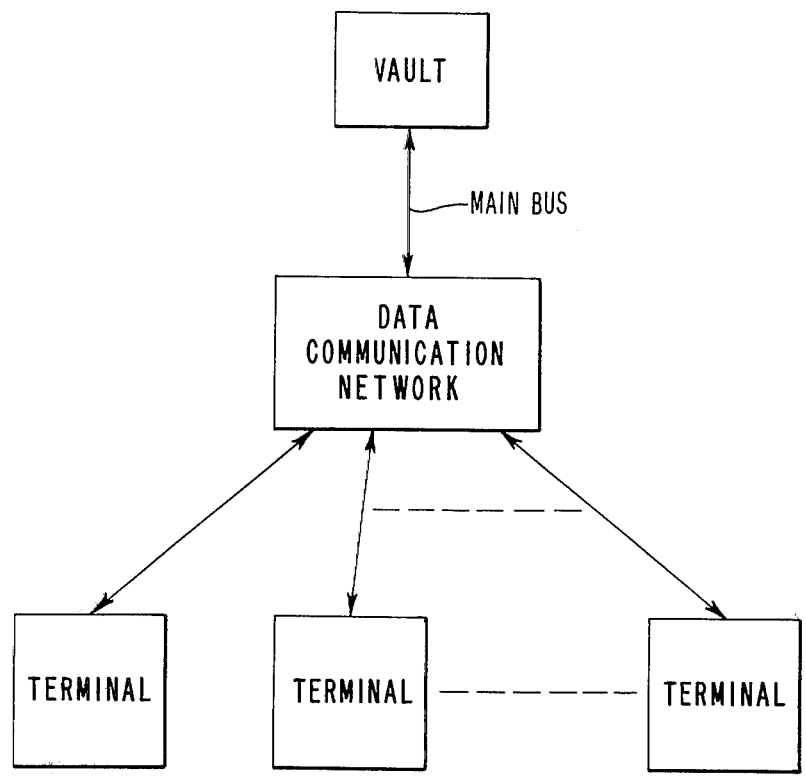
FIG. 1.1 comprises a high level block diagram illustrating the overall system architecture of the present electronic verification system.

In referring to FIG. 1.2 it should first be noted that the figure is partitioned vertically by dotted lines to designate Station A, Vault and Station B. It should also be noted that the upper level of data flow in the figure refers to the first sequence of operations, i.e., from A to the Vault and then from the Vault to B. The lower data flow path in the drawings refers to the second sequence of operations namely from B to the Vault and from the Vault to A. In the figures the blocks designate the hardware resources necessary for the description of the protocol. Thus Station A includes three blocks designated A/B, Data and BC. These refer to the particular message segments stored in appropriate registers in the station. Similarly, Station A contains a box marked $\pi$ on the upper level of the drawings and $\Sigma^{-1}$ (step-code) on the lower level. Similarly, the key $K_A$ is shown entering this block from the bottom. As will be appreciated from the subsequent description the $\pi$ relates to the simple block-cipher encryption function under the designated key, whereas the $\Sigma^{-1}$ relates to the step-decoding function necessary to decode the messages ST1 and ST2 received from the Vault. The same comments apply to the $\pi$ and $\Sigma^{-1}$ blocks under Station B also.

The blocks indicated as C1, BL1, Legal Store, BC, and A/B refer to a specific storage location in Station B's memory designated by microprogram control when performing a "receive" operation. Further, in Station A the blocks marked Memo and Legal Store are memory locations provided by the microprogram control for the station when the station is operating in "sender" mode. The particular function of these various registers will be more clearly understood from the following description. Finally, the information appearing in the bracketed portions of the figure refer to the actual messages being transmitted between the various units of the system. The message block designation, i.e., BLX, refer to the specific contents of a particular message, it being noted that the message contents necessary for the present embodiment are specifically set forth in the subsequent general description of this figure, and the system flow charts of FIGS. 6A through 6E, and also the timing sequence charts which follow. Thus, for example, the message designated BL3 contains $D \oplus BC2 \oplus C1 \oplus A/B$. When the bracketed portions have a specific designation under them, i.e., C1, ST1, C2 and ST2, this refers to an encrypted message actually appearing on the communication lines of the system. The particular key under which a particular message is encrypted appears at the bottom right hand corner of the bracket, i.e. $K_A$ for message C1.

To transmit data D, station A prepares the Block $BL1 = (A/B \oplus D \oplus BC)$ where A/B represents the addresses or names of Sender and Receiver. BL1 is enciphered with key $K_A$ by A's DES box and the resulting cipher $C1 = \pi(K_A, BL1)$ is transmitted to the Vault along with the name of A in the clear over the direct line shown. A, memorizes a copy of C1 in the "MEMO" block.

The Vault deciphers C1 and inspects BC. If BC is acceptable, the Vault has established that C1 indeed originated with A. The Vault now replaces BC as received from A with the BC now valid at the Vault and prepares to form a step code ST1. ST1 comprises the step-code encipherment of BL3 under key $K_B$ where $$BL3 = D \oplus BL2 \oplus C1 \oplus A/B$$

Upon reception, Station B deciphers step-code ST1. If his local BC matches BC of the step-code, B will accept the contents of ST1 as authentic transmissions from the Vault. Moreover, B will not only find in ST1 the contents of message BL1 now enciphered with his key $K_B$ so that he can read it, but also a copy of C1. The important fact is that this copy of C1 is now certified by the Vault as having originated with A. B stores C1 for his own protection in case of a later litigation. We observe that B cannot read C1, because it is enciphered with $K_A$, which B does not know. B can also not alter C1 with impunity, because such an action would turn the corrupted C1 into garble upon decipherment and B must have received an uncorrupted C1 in the step-code, otherwise the authenticator would have failed. Where is the signature?

It exists de facto because B now owns a copy of C1, which he could not have manufactured by himself, and which is certified by the Vault as having originated at A. A can no longer deny having transmitted C1 to B through the Vault.

B, now prepares a return communication to A, which is intended to give A the same protection that B already has. In fact the return communication has the same structure as the original communication, for the system is completely symmetrical, i.e., B could have sent an order to A through the Vault and obtained a confirming return communication.

To transmit the confirming return communication to A, B prepares a cipher $C2 = \pi(K_B, BL5)$ preceded by his address in the clear. In this message $$BL5 = C1 \oplus BC3 \oplus A/B.$$

The Vault deciphers C2, authenticates C2, and finds C1 therein. It next prepares a step-cipher ST2 for transmission to A.

ST2 will now contain a certified copy of C2 and C1, the entire step-code ST2 being enciphered with $K_A$. Thus $ST2 = \pi(K_A, BL6)$ where $$BL6 = BC4 \oplus C1 \oplus C2$$

A, upon receipt of this message, finds C1 which he compares with C1 which he stored at the beginning of the loop in the Memo Block. He also finds C2 which he cannot decipher, but he has the assurance of the Vault that it is indeed an encipherment of C1 with $K_B$, checked for authenticity as having originated with B. A stores C2 in his Legal Store block.

A and B are now on equal footing. Transactions are not considered trustworthy unless this state of information exchange has been attained.

In case of a litigation, A and B appear with a legal Arbiter in front of Box V. (The Arbiter might be the person(s) entrusted with K*).

The cipher $\pi(K_A, K_A)$ and $\pi(K_B, K_B)$ are first presented to the Arbiter by A and B which are deciphered to establish the keys owned by A and B. Then C1 and C2 are deciphered using $K_A$ and $K_B$, furnishing the required legal proof with the degree of reliability specified by the dimensions of the vectors BC.

It will be readily understood by those skilled in the art that the present Electronic Signature Verification system could also be operated non-synchronously without clocks by using a handshake procedure.

It may be reasonably concluded that properly used centralized authentication is very effective in electronic signature verification. However, the ultimate reliability of such verification is equivalent to the degree of authenticity that the underlying coding structure can provide. Stated differently, it is contingent upon the inherent security of the cryptographic system used. The preceding description of the overall system message handling protocol as set forth in FIG. 1.2 provides a basic understanding of the present invention. It will be appreciated that the essence of the invention resides in the message handling protocol per se and not in any specific hardware implementation thereof. The specific requirements from the standpoint of hardware are shown generally in FIG. 1.1 wherein Station A and Station B would obviously be two of the Terminals shown in this figure. The block entitled, Data Communication Network, could represent the Host CPU in a Terminal oriented system or the centralized message handling facility of a loosely constructed Terminal net, wherein each Terminal contains its own local CPU. In both instances the Vault would be located in this central facility.

It will be apparent to those skilled in the art that the specific operations occurring in both the Terminals and in the Vault are relatively straightforward per se and could be performed by either hardware or software. The particular embodiment specifically set forth in FIGS. 2 through 5 is basically a microprocessor controlled unit of a conventional design wherein all required subroutines are appropriately stored in the control memory of the microprocessor whose routines are accessed by predetermined signals appearing on the input line to the system or, when appropriate, by system initialization operations.

The flow chart of FIGS. 6A through 6E functionally describes the significant operations occurring within the three system entities at any particular point in time when an electronic signature verification operation is called for. These entities are Station A the "sender", the Vault, and Station B, the "receiver". Referring to FIGS. 6A through 6E, and specifically to the User A and User B flow charts respectively, it will be observed that both the "sender" and "receiver" functions must be included in each terminal. Whether a particular terminal unit is functioning as a User A or User B, will determine which of the specified functions that particular user's terminal will perform. This determination is made in blocks 1 and 2 of the User A and User B flow charts respectively.

Best Mode for Carrying out the Invention

Figure 4:
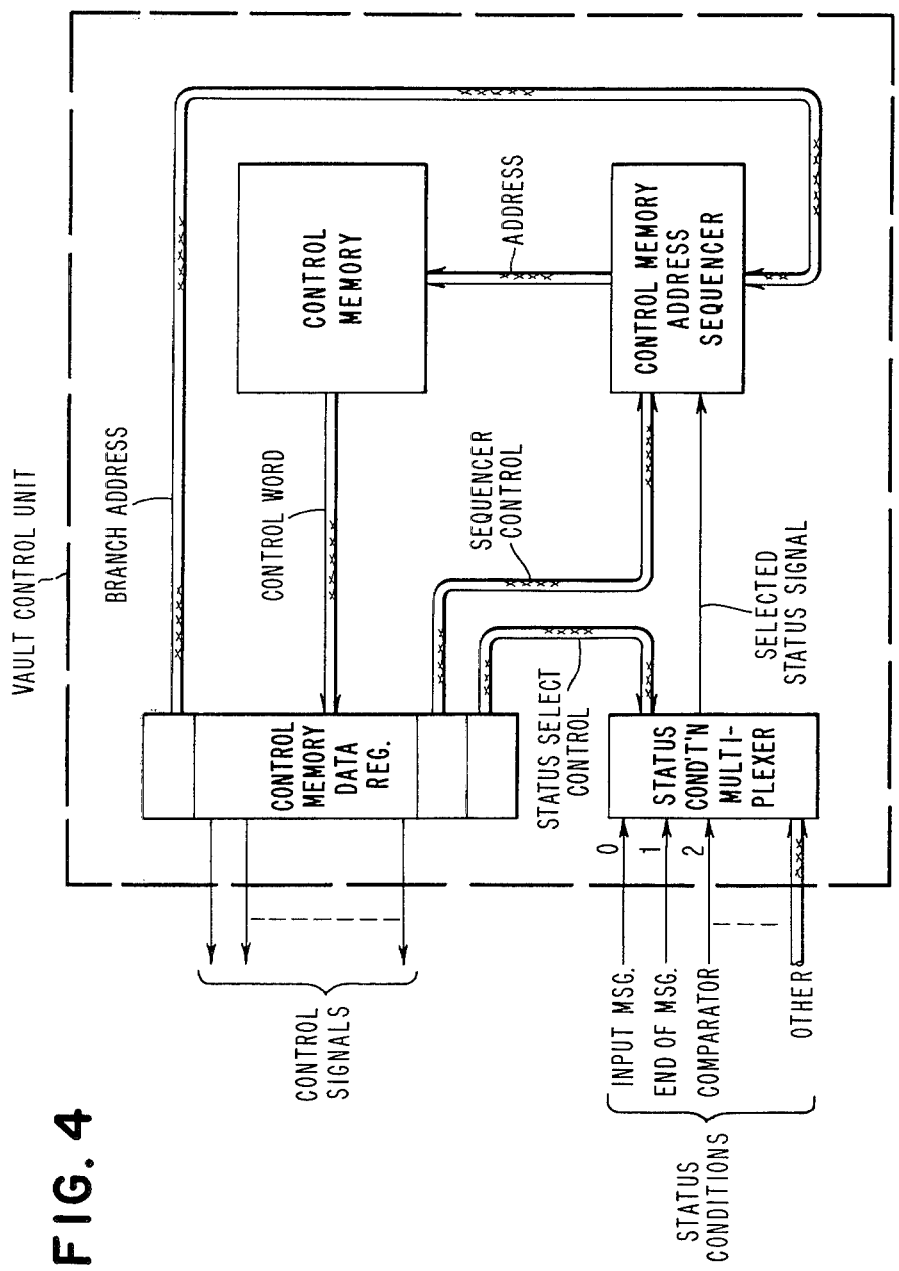
FIG. 4 comprises a functional block diagram of the Vault Control Unit shown in FIG. 2.
Figure 5:
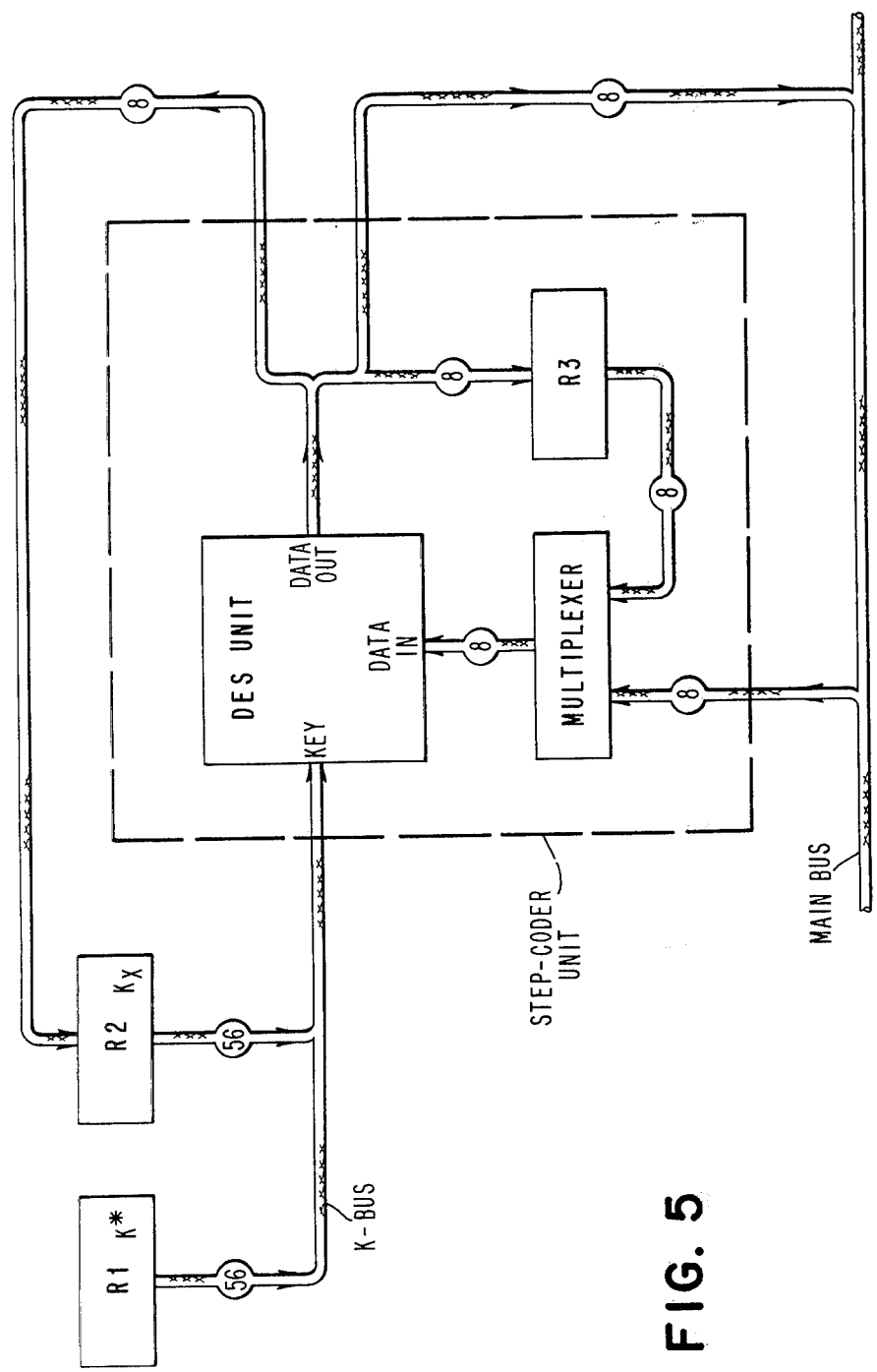
FIG. 5 comprises a functional block diagram showing the details of the Step-Coder Unit of FIG. 2.

FIG. 1 comprises the general architecture of an N to N communication network suitable for carrying out the principles of the present invention. The existence of a Data Communication Network and plurality of communicating Terminals is well known in the art. As shown in the figure it is assumed that the Vault is available to the network over the Main Bus which is obviously also available to each Terminal in the system. The functional details of the Vault are set forth in FIG. 2 and similarly the functional details of a suitable microprocessor controlled terminal are set forth in FIG. 3. FIG. 4 illustrates the functional details of the Vault Control Unit shown in FIG. 2 and FIG. 5 shows the details of the Step-Coder Unit as shown in FIG. 2.

In view of the fact that virtually all of the functional blocks in all of the figures are specifically named, additional reference numerals have not been used as they are considered unnecessary. The subsequent description of the flow chart of FIGS. 6A through 6E taken together with the specific timing sequence chart for the Vault clearly illustrate the detailed operation of the present system. In essence the flow chart discloses the function required at each point in the process and the timing sequence charts enumerate the actual hardware operations which ensue. Before proceeding with the specific system description relating to the flow chart there will follow a general description of the overall system architecture of the various components as set forth in FIGS. 2 through 5.

Figures 1, 2:
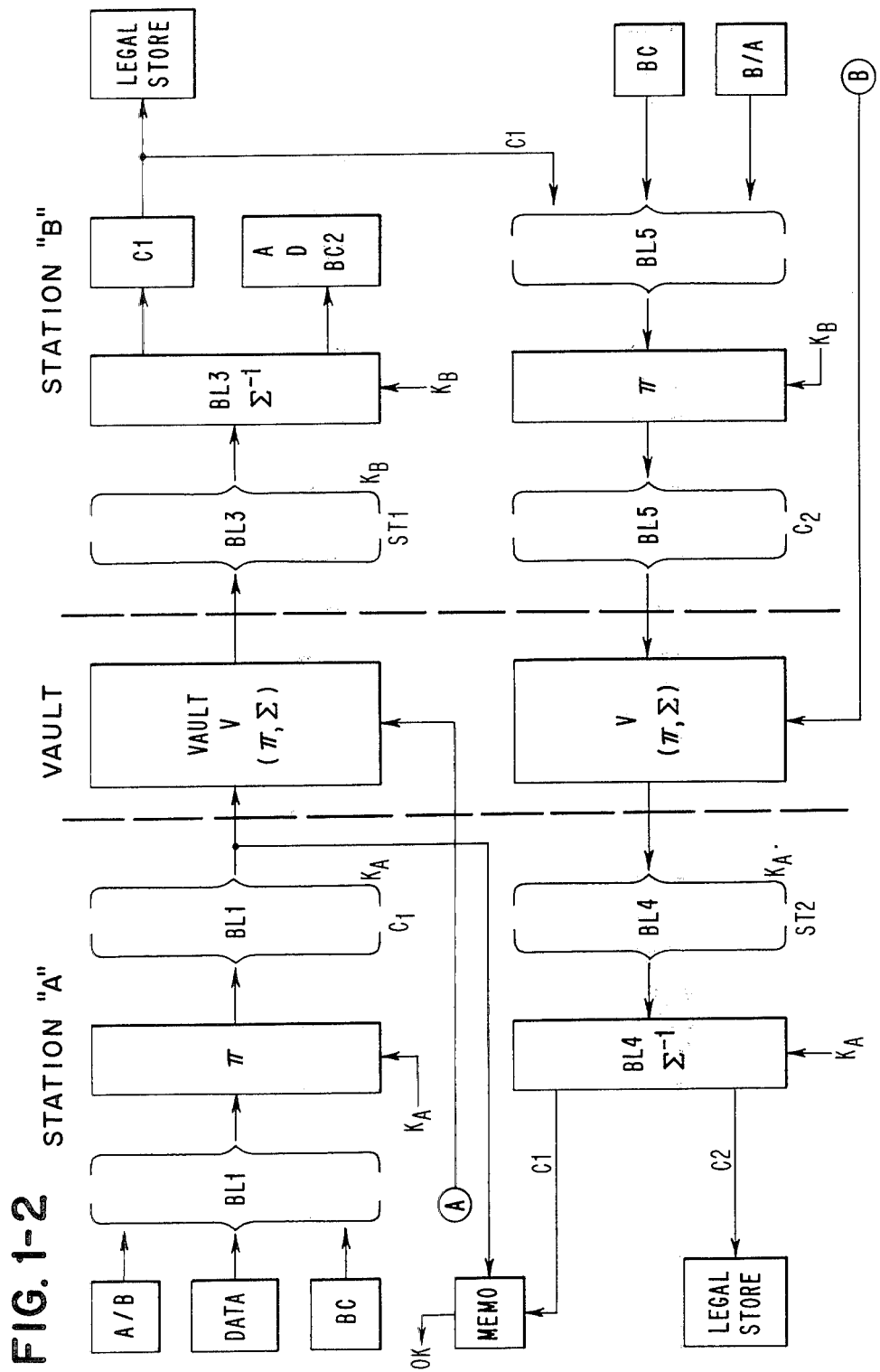
FIG. 2 comprises a functional block diagram of the Vault shown in FIG. 1.

FIG. 2 is a generalized functional block diagram illustrating the architecture of the Vault. The blocks marked Address Generators, Copy Store and Message Store, are the means whereby the Vault Control Unit stores the various messages segments received in memory for later use. These units provide addresses in memory under control of specific commands of the microprocessor making up the Vault Control Unit and function in a well understood manner.

The Comparator block is for the purpose of comparing the vectors BC on received messages with the synchronized system binary clock located in the Vault. This block would have an output going to the Status Condition Multiplexor within the Vault Control Unit shown in FIG. 4.

The Step-Coder block and the associated registers R1 and R2 are utilized to perform the necessary encryption and decryption operations within the Vault. It will be noted that the Step-Coder contains the DES block which, as stated previously, is a key-controlled block-cipher cryptographic unit having a key input port and data input port as well as a data output port. This unit is utilized for key generation purposes, the encipherment of Step-Coded messages and the decipherment of conventionally encrypted messages (i.e., not step-coded). The block BC provides the local timing quantity from a binary counter therein which is substantially identical to the Programmable Timer block shown in the terminal of FIG. 3. As was stated in the previous general description, all of these system clocks are syncronized to within very close tolerances and much of the ultimate authenticity of the present system for some applications is predicated upon the timing function. The Vault Control Unit shown in FIG. 4 is the micro processor control for the Vault. As is well known with such systems, the input to the unit marked Status Conditions are lines coming from the various functional units within the Vault and also from the Main Bus in the communication network. Control Signals emanating from the right portion of this unit control the various gating, testing and other functions within the Vault Architecture in a well known manner.

Figure 3:
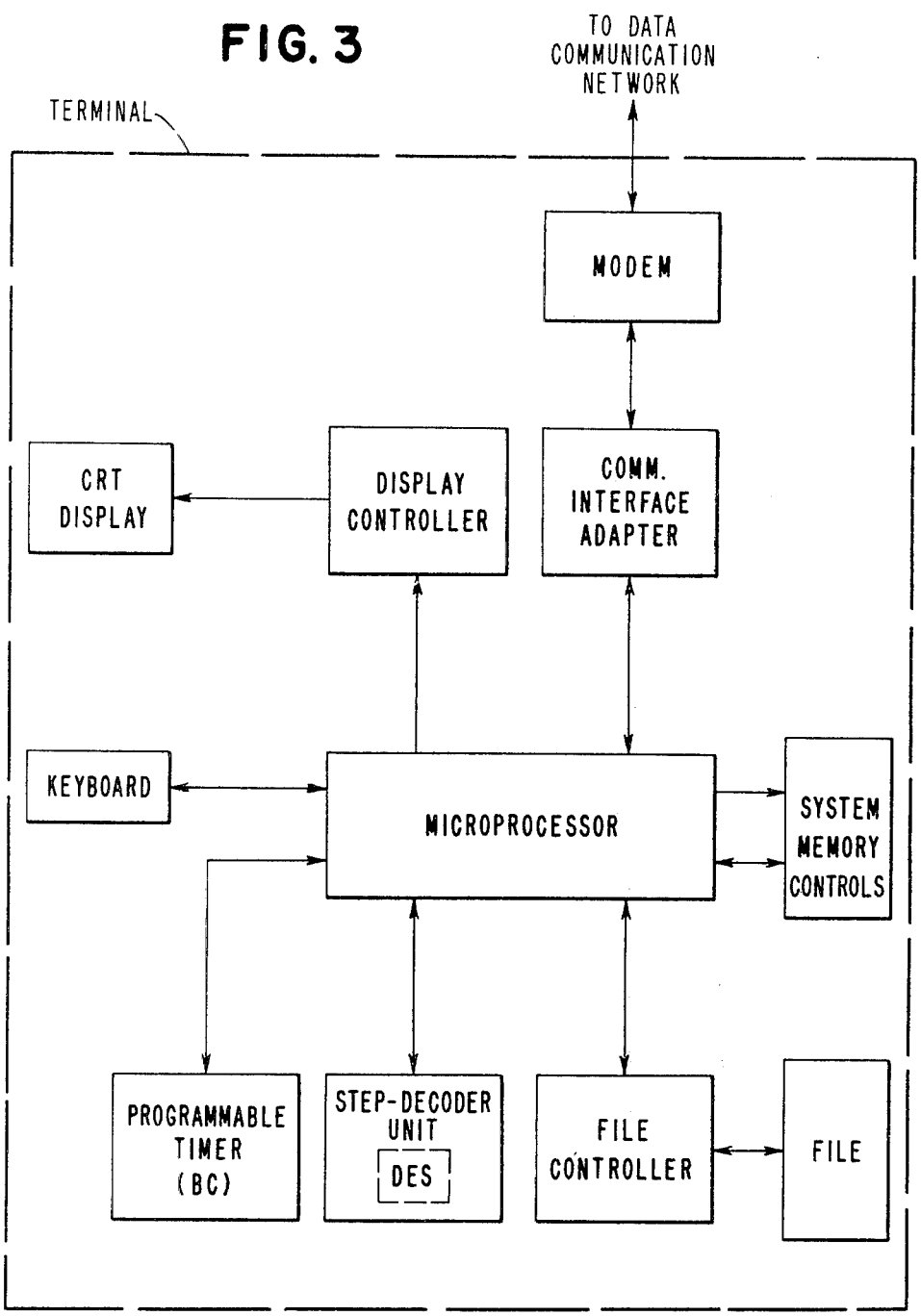
FIG. 3 comprises a functional block diagram illustrating the architecture of one of Terminals shown in FIG. 1.

FIG. 3 shows the structure of a typical remote terminal suitable for use with the present system. The majority of the blocks of the terminal are completely conventional in nature and operate in a straightforward way. For example, the MODEM block is a modulator/demodulator well known in the art for connecting the terminal to the data bus. The CRT Display and Display Controller perform the obvious function of displaying information keyed into the terminal via the Keyboard, accessed from the system memory, or received from the CPU. The Keyboard is a conventional unit for entering alphanumeric data and, for purposes of the present invention, it should be understood that the user keys $K_A$ and $K_B$ could either be entered via the Keyboard or could be stored in the Terminal System Memory uniquely accessible via a special code enterable at the keyboard by a particular user. Thus, a number of different users having different user keys $K_X$ could utilize a single terminal in accordance with the teachings of the present invention it being understood that their particular keys would either have to be entered at the Keyboard or suitably accessed from the System Memory. Several unique devices are required of the terminal for practicing the present invention. The first is a Timer (BC) which would be accessed to produce the counter values BC2, etc. mentioned in the previous description of the present transaction verification system. The second is the Step-Decoder Unit shown in the Terminal. It is substantially identical to the Step-Coder Unit in the Vault and each includes a standard key-controlled block-cipher encryption device (DES block). As is apparent the step decoder in the Terminal performs the decoding of the messages, ST1 and ST2 while the Step-Coder in the Vault encrypts same. The hardware is identical in both cases although the data flow is changed in a well known manner.

It will be noted that the encryption operation denoted herein by the symbol ($\pi$) in the formulas operates in a straightforward manner when provided with an encryption key $K_X$ and a data block to be encrypted or decrypted. Given this data, the DES block will automatically produce encrypted ($\pi$) or decrypted ($\pi^{-1}$) data in its output. The block marked File Controller is a back up storage device associated with the terminal unit and would be used, for example, to store messages when the terminal is used as a sender, i.e., User A, or as a receiver, i.e., User B. In this case it should be clearly understood that User A and User B in the present description, refer to the sender and receiver of a particular transaction respectively.

The operation of such terminals under control of a suitable micro processor or micro computer is well known in the art and will not be described in greater detail since the performance of the various operations required of the terminals are extremely straightforward and well known as is the case with the Timer and also the Data Security Module.

FIG. 4 is a functional block diagram of a typical microprocessor control system applied to the specific Vault Control Unit as shown in FIG. 2. The various components of the unit are straightforward in operation wherein the control memory is essentially a read only memory where the various operational or control sequences are stored. A particular sequence is selected by the particular address shown as the Address input to this device. The address provided to the Control Memory would come from the unit marked Control Memory Address Sequencer. Thus an address could be provided by some direct input to the system. In this case it could be a system initializing signal shown in the flow charts as block 1 for both User A and User B. This would essentially place the system in a 'wait' state looking for either a 'send' or 'receive' message signal coming in via the Status Conditions Line. Other addresses would be supplied as a result of the Sequencer Control Input which would cause the next sequential address in a particular sequence to be taken or, alternatively, a branch address supplied by the immediately preceding instruction. The branch condition would be supplied via the Status Condition Multiplexor box via the status condition line.

Similarly, as is well known, the Control Memory Data register is the memory output buffer which contains the actual data words making up the particular instructions stored in the Control Memory. These instructions are directly interpreted by this unit to produce the necessary control signals to operate the Vault hardware. The subsequent description of the flow charts and timing sequence charts will clearly indicate the various signals which would be required of the Vault Control Unit at any point in time and also the specific functional units within the Vault which would be controlled thereby.

FIG. 5 is a more detailed showing of the Step-Coder unit within the Vault. As stated before, the architecture of the Step-Decoder within the Terminal would be substantially identical, it being noted that the decoding operation in the Terminal would require inverse operations of the DES blocks to perform the decoding operation. It is of course obvious that the input to the encoder would be clear data whereas the input to the decoder would be encrypted data, etc. The DES unit within the Step-Coder and Step-Decoder is used for generating the various user keys $K_X$ using the Terminal storage key $K^*$ together with the specific user name or address as supplied by the system. Similarly, this DES unit is utilized to decrypt the messages C1 received from User A and C2 received from User B. The register R1 and R2 in the figure are utilized to store $K^*$ and the generated user keys $K_X$ respectively. It is noted that only register R2 which stores the current working key is utilized during the various encryption and decryption operations required of the system. Further, register R3 and the multiplexor are utilized for providing the required data chaining function as necessitated by the step-coding (decoding) operations. The specific way in which these two units are utilized is set forth clearly in the description of blocks 10 and 15 in the flow charts and timing sequences charts.

Having thus generally described the functional hardware of the preferred embodiment as set forth in FIGS. 2 through 5, there will now follow a description of a typical electronic signature verification sequence performed by the system.

The following description will refer to the specific numbered blocks included in the flow chart of FIGS. 6A through 6E. The timing sequence chart for the Vault which immediately follows the description should be read concurrently with this description it being noted that the particular step numbers relate to the particular block of the flow chart. The subnumbers specify the specific steps required within the hardware to perform the gross function. Further, only the timing sequence chart for the Vault unit is included herein as the various sequences required of the Terminal whether operating as User A, a sender, or as User B, a receiver, are substantially identical to those of the Vault. It is accordingly believed that it would be obvious for a person skilled in the art utilizing the high level flow chart of FIGS. 6A through 6E together with the timing sequence charts for the Vault to readily construct similar microprogram or hard-wire control sequences for the Terminals.

Referring now to the figures, it is at first assumed that all Terminals are initialized, that is User A and User B are operating in an electronic signature verification mode and that the control sequence indicated by block 1 in both cases is active. Similarly, within the Vault, it is assumed that the Main Bus is being monitored for ESV messages addressed to it. The ESV sequence would obviously begin within the Terminal of User A, since he is a sender and is initiating a message. It is assumed here that the User A has appropriately entered a data message D, has identified himself as a sender and User B as a receiver and has now indicated to his Terminal that he wishes to send a message to someone utilizing the ESV PROCEDURE.

A "no" evaluation of block 1 initiates block 2 which tests the system bus for a 'received message?' condition and if the answer to this is likewise 'no' the Terminal returns to the 'wait' state and continues recirculating through blocks 1 and 2 until either a 'send message' signal is detected or a 'receive message' signal is detected.

Assuming now that the system proceeds to block 3 the Terminal controls cause the message DL1 to be formed from the data previously entered by User A into the Terminal. The data content of message BL1 is shown clearly in block 3. The system then proceeds to block 4 which causes the Terminal DES unit to form cipher message C1 which is informed by encrypting the message BL1 under the key $K_A$ as shown in block 4.

The system then proceeds to block 5 which causes a copy of C1 to be saved in the "memo" location for subsequent comparison with the message C1 returned from User B later in the transaction. Proceeding then to block 6 the message A $\oplus$ C1 is sent to the Vault. At this point the controls of User A go into a 'wait' state via block 7 where the system controls of the Terminal will wait until a message is received from the Vault. At this point the system proceeds to Vault which is in the 'wait' state as specified in block 1 thereof.

When the message from station A appears on the Terminal line, the Vault recognizes its address and will know that a message has been transmitted to same. This causes the Vault microprogram sequence to proceed to block 2 which causes the message C1 together with A's name to be read into the Vault storage. Block 3 analyzes the message format to determine if it is a 'cipher' or 'resend' request. It should be noted that the 'resend' request causes the system to branch to block 18 and could come from either User A or User B and would result in the step ciphers ST2 or ST1 respectively being sent to those parties.

Assuming at this point that the message classification block 3 detects a cipher, the system proceeds to block 4 which, utilizing the name, in this case, of User A initiates a key generation operation in the Vault to produce User A's key $K_A$. It will be noted in the flow chart that this is designated $K_X$ because at this point the system does not know whether or not User A is a sender or a receiver. $K_A$ is stored in register R2 within the Step-Coder unit and the system proceeds to block 5. In this operation the Vault deciphers the message C1 received from User A. It will again be noted that in the formula within block 5 the message is referred to as CY as it is not known whether the message just received is C1 or C2.

In block 6 the authenticity of CY is checked. This is done by comparing the BC field included in message C1 with the BC field in the local counter within the Vault. It will be noted that any irregularity in the message will cause this check to fail. This would include failure of account value, an error in the transmission which might effect several bits in the cipher C1 being conveyed to the Vault or an incorrect address or name supplied to the Vault in clear for purposes of forming the key $K_A$. If the authenticity test should fail, the system would go to block 19, whereupon User A would be requested to resend his message.

Assuming that the test is successful the system proceeds to block 7 wherein the A/B field of the message is interpreted and it is determined, in this case, that User A is the sender. This now tells the Vault that the person sending the just received cipher is User A, the sender rather than User B, the receiver. At this point the system proceeds to block 8 and in this block the Vault forms the message block BL3 with the data indicated in block 8 on FIG. 6C and proceeds to block 9 at which point User B's address or name as received from User A, is utilized by the Vault to generate the key $K_B$. This is then stored in register R2. At this point the system proceeds to block 10.

In block 10 a step encipherment of the message block BL3 is prepared utilizing the data chaining concept described previously and set forth in more detail in the timing sequence chart for step 10. The output of this block is the step-cipher ST1.

The system then proceeds to block 11 which causes a copy of the step cipher of ST1 to be saved in case retransmission is necessary due to a request from User B.

The system then proceeds to block 12 wherein step-cipher ST1 is sent to User B and the system returns to block 1 where it returns to a 'wait' state for the next message to be received from other users on the system. At this point User B detects his address sent in 'clear' on the Main Bus together with step-cipher ST1. Block 1 of the User B flow chart determines that a message is being received rather than sent and causes the system to proceed to block 2. Since this is a 'received message' situation the User B Terminal proceeds to block 3 which causes the message ST1 to be placed in User B's memory. The system then proceeds to block 4 where a message classification test is made to determine whether the received message is a step-cipher or a request to repeat the sending of a previous message to the Vault which, in this case would be the message B⊕C2. This message would have been received from block 19 at the Vault's control sequence as described previously. Assuming that the message is legitimate the system proceeds to block 6 within the User B's flow chart. At this point the Terminal step-deciphers the received message ST1 into the components thereof which are designated herein as message block BL4. It should be noted at this point that the contents of BL4 should be the same as the contents of BL3 prepared within the Vault.

Proceeding to block 7 the message segment C1 forming a part of decoded message block BL4 is saved in User B's Legal Store for transaction authentication operations in the future should a question of authenticity arise.

The system now proceeds to block 8 wherein a test of the authenticity of BL4 is made. As before this is done by checking the local binary counter value BC against the counter value BC extracted from the message BL4. As stated previously any deviation from a predetermined tolerance causes the message to be interpreted as unauthentic and a branch to be taken to block 9 which requests that the Vault resend the message ST1. This of course assumes that the fault is the result of some transmission error. If the resend request does not result in a correction of the error the transaction will be terminated assuming reasonable notice to the parties involved. A determination of the nature of the problem would have to be determined by means not within the purview of this invention.

Assuming that the authenticity test is successful the system proceeds to block 10 in User B's Terminal. At this point the procedure shown on the lower level of the FIG. 1.2 is, in effect, entered and User B's Terminal compares block BL5 having the data content shown in block 10 of User B's Terminal flowchart on FIG. 6E. The system then proceeds to block 11 wherein the message block BL5 is enciphered (normally) to form the message C2.

This message is sent to the Vault in block 12 together with B's name or address in clear. Upon the termination of this operation, User B's Terminal controls return his system to block 1 and the electronic signature verification operation is terminated insofar as User B's active participation is concerned.

At this point User B's message on the Main Bus causes the Vault's 'wait' state of block 1 to be interrupted and the message is read into the Vault's storage in block 2 of the Vault's flow chart. The termination of block 2 initiates block 3 of the Vault's sequence.

In block 3 the message C2 received from B is classified. Since the message C2 is a cipher the system proceeds to block 4. Had it not been a cipher it is assumed by the present embodiment that it would have been a 'resend request' from either User A or User B. This would be determined by reading the clear address of the particular user sending the message from the message header and a copy of the last step-cipher saved in block 11 or 16 would be retransmitted to the requesting user.

It should be noted in passing that the present embodiment presumes a single transaction occurring within the system at any given time, however, it will of course be understood that in a sophisticated system many users could conceivably be using the Vault in overlapped fashion and suitable time sharing and interleaving means would have to be provided to maintain the integrity or separation of various user activities within a Vault. This would be well within the skill of those utilizing such a system and these details are not set forth herein as they would merely obfuscate the invention.

Assuming that the system has proceeded to block 4 the key $K_B$ is generated using B's name which was transmitted along with his message C2 and this key is stored in register R2 within the Vault Step-Coder Unit.

The system proceeds to block 5 in which the cipher C2 is deciphered by the DES unit within the Step-Coder using the key $K_B$ stored in register R2. At this point the system proceeds to block 6.

In block 6 an authenticity test for the message C2 is made based again on checking the count value BC included within the message block BL5 with the count value BC from the Vault's timer. If this check is satisfactory the system proceeds to block 7.

In block 7, as described before, the A/B field designating the identities of the sender and receiver of the message are decoded and it is determined in this case that B is the receiver. This causes the system to proceed to block 13.

Figure 6B:
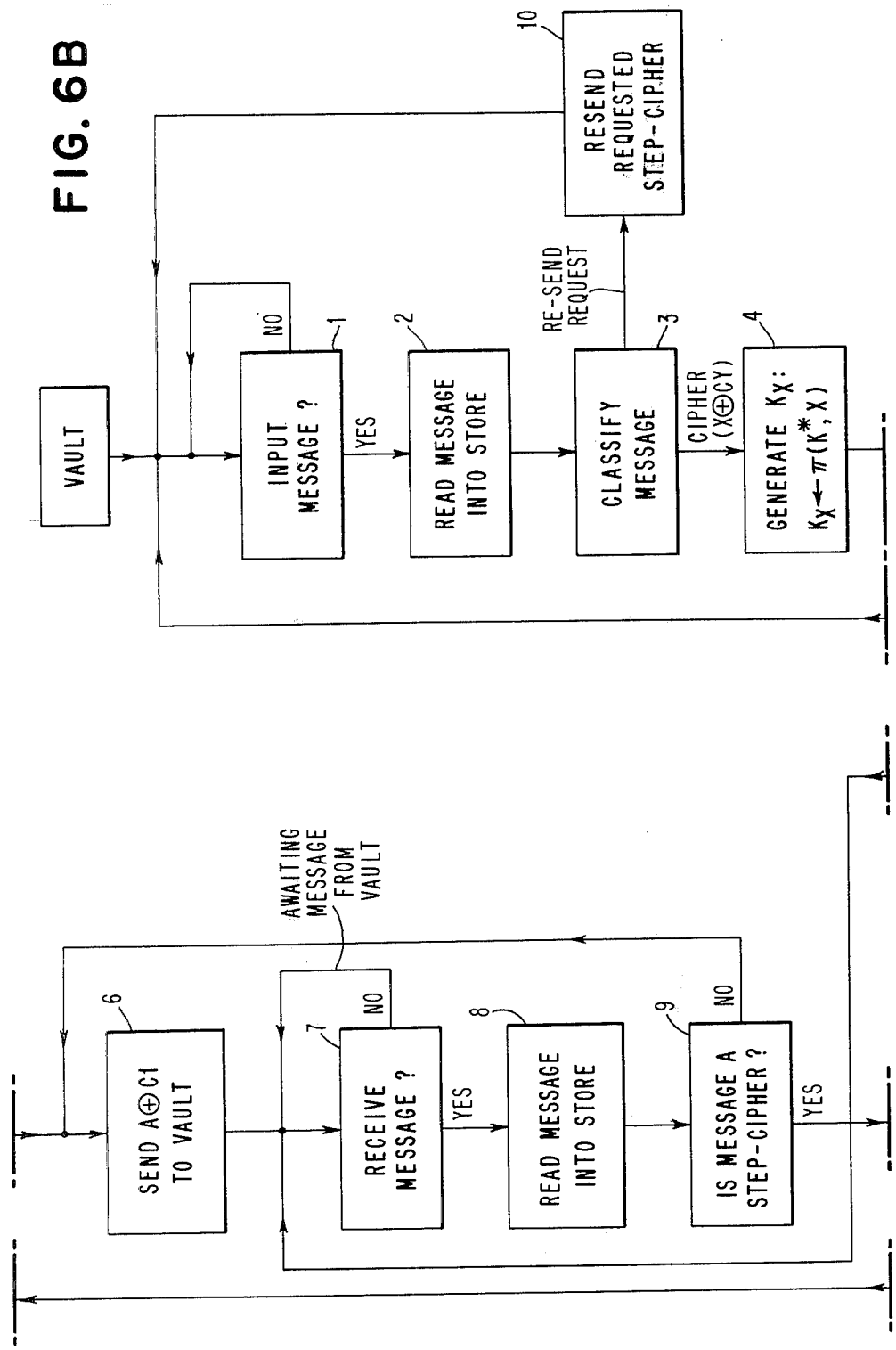
Figure 6C:
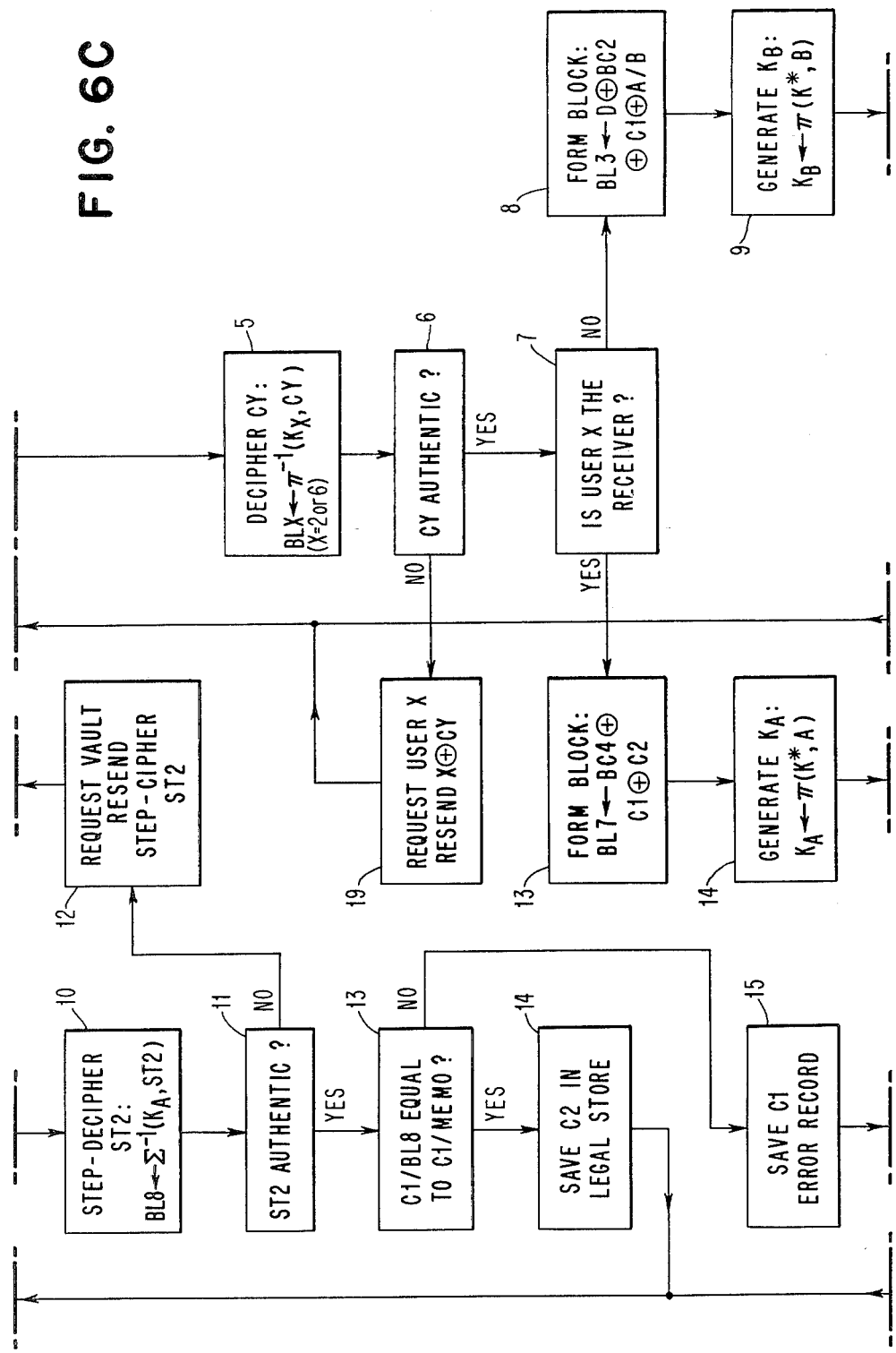
Figure 6D:
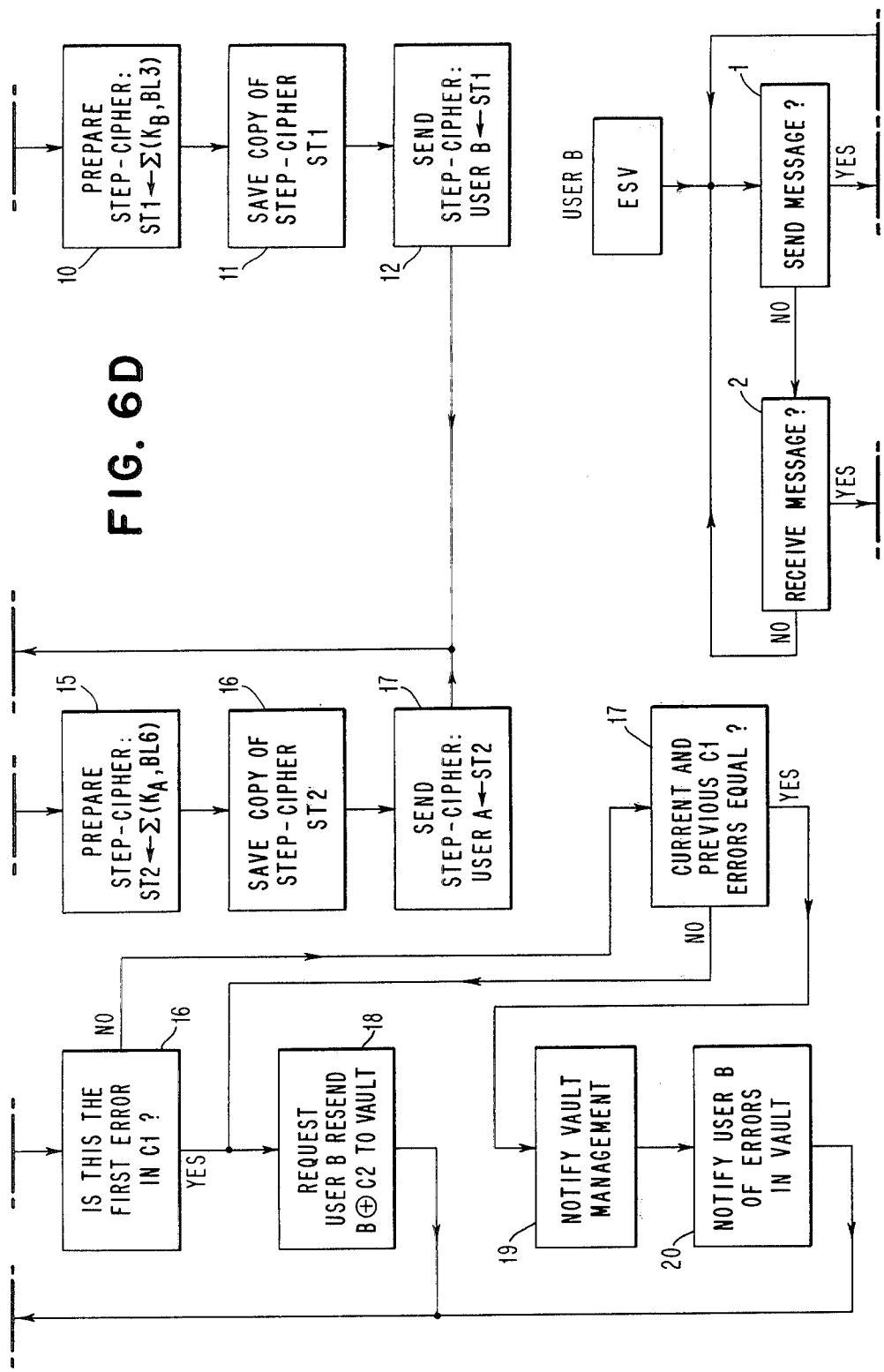
Figure 6E:
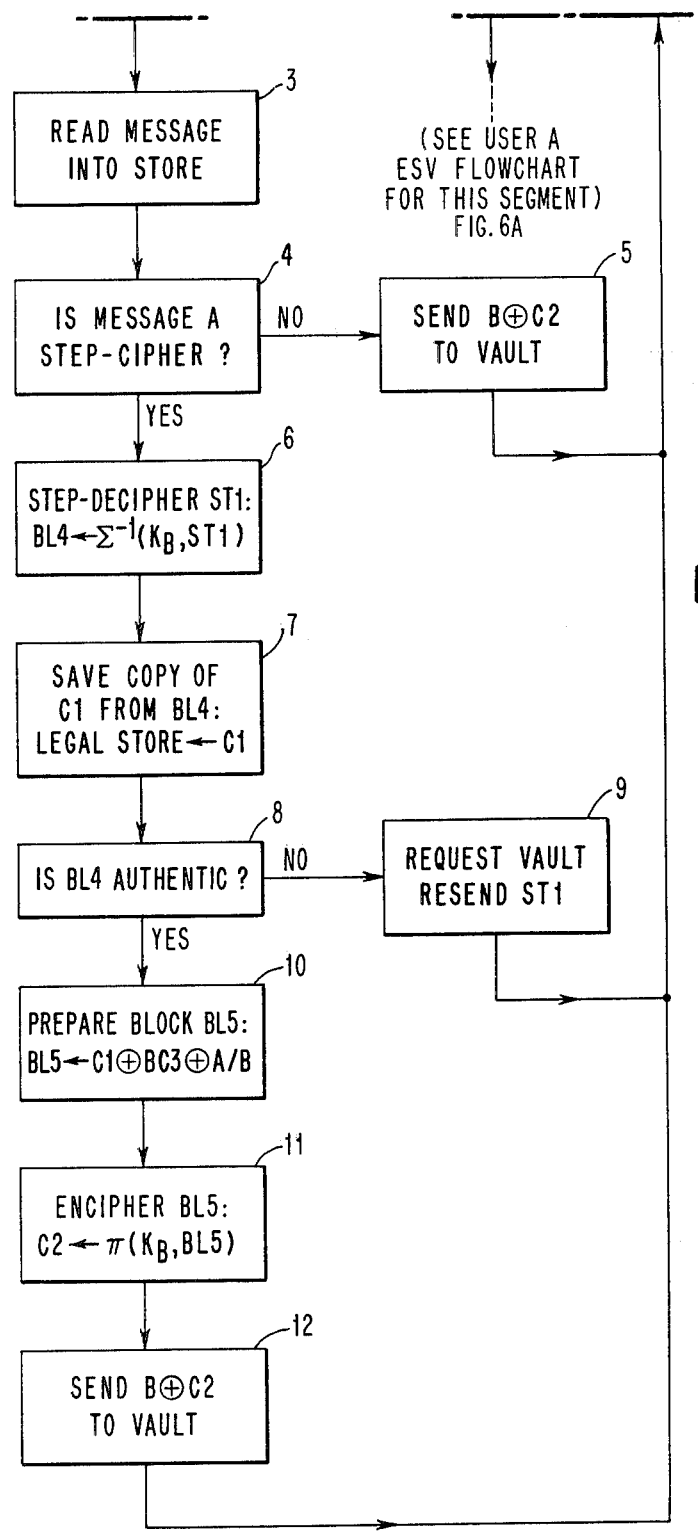

In block 13 the Vault Control causes message block BL6 to be formed wherein the specific data content of BL6 is specified within block 13 of the flow chart appearing on FIG. 6C. The system then proceeds to block 14.

In block 14 the sender's identity or name A is accessed and A's key $K_A$ is generated. The system then proceeds to block 15 wherein the step-cipher ST2 is generated from the message block BL6 formed in block 13 and A's key $K_A$.

The system then proceeds to block 16 wherein a copy of the step-cipher ST2 is saved and in block 17 this step-cipher is sent to User A. At this point the Vault's direct involvement in the transaction is terminated and returns to the 'wait' state as defined in block 1 of his flow chart on FIG. 6B.

At this point the message cipher, message ST2 is on the Main Bus together with A's address in clear. It will be noted that in the previous description of User A's flow chart, his controls were left as specified in block 7. At this point the message appearing on the Main Bus causes block 7 to be activated and his controls proceed to block 8 which causes the message ST2 to be placed in storage at User A's Terminal. The system then proceeds to block 9 wherein a test is made to see if the message is a step cipher, if not, it is assumed that it is a 'resend request' received from the Vault which returns the system to block 6 which would have caused the message A⊕C1 to be resent to the Vault and returned User A's Terminal into the 'wait' state in block 7.

However, at this point, it is known that the message ST2 is on the system bus which causes the system to proceed to block 10, which initiates a step-decipher operation within User A's Step-Decoder Unit. The result of this decipherment is message block BL7 which, if everything is proper, should be the same as message block BL6 formed within the Vault in block 13. This validity is checked in block 11 of User A's Terminal. As in all previous instances this authenticity is checked by comparing the count value BC within the just decoded message block BL7 with the count value BC currently within User A Terminal's Timer. If it is found that the count values are not equal within acceptable limits, the system would proceed to block 12 which would cause a 'resend request' to be sent to the Vault wherein step-cipher ST2 would be retransmitted, and User A's Terminal sequence would go back to block 7.

Assuming, however, that the message is authentic User A's sequence proceeds to block 13 wherein a check is made to see if the original message C1 stored in User A's memo file is equal to the value C1 just received in the message segment BL7. It will be remembered from the previous description of the system that the essential feature of the present system is the identity of the message content throughout the system transmissions. If they are not equal an error procedure beginning with block 15 would be entered.

Assuming, however, that the messages are equal, the User A's control proceeds to block 14 which causes the message segment C2 to be saved in User A's Legal Store. It will be remembered from the previous descriptions of the present protocol, that message C2 contains substantially the same content as original message C1, however, it is encoded under user B's key $K_B$ and in the event of subsequent disputes the decoding of message C2 by the authenticator will reveal just what message User B received and similarly the decoding of the message C1 from User B's Legal Store by the Authenticator will reveal the specific data contents of the message sent by User A to User B. It is of course this factor that prevents any message alteration or reneging on the part of either User A or User B.

The completion of block 14 within User A's Terminal completes the electronic signature verification operation of the present system assuming that no errors were detected in block 13.

At this point it will be noted that blocks 15 through 20 within User A's system comprise an error detection facility and specifies a series of steps to first detect and then determine if possible the source of specified errors. Assuming that block 15 has been entered from block 13, block 15 causes A's Terminal to save the error record of C1. In block 16 a test is made to see if it is the first detected error in C1. If it is not, the system branches to block 17 which tests the quality of the current value of C1 (it causes the current error with the previous error). If the errors are not equal the system proceeds to block 18 wherein the direct request to User B by User A to resend his message B⊕C2 to the Vault.

If the errors are equal as detected in block 17, the system would proceed to block 19 wherein the Vault managment would be notified by some prearranged method external to the present system of a fault condition within the Vault. In block 20 User B would be notified by User A that errors have been detected which are caused in the Vault. FIG. 7, which is a schematic illustration of the various messages sent within the system between User A, User B and the Vault, indicates all of the error situations detected in the left hand column at the bottom of FIG. 7 and specifies the recovery procedures to be used in the right hand column. Thus, the first four entries where a non-authorization occurs, means a non-authorized counter value (AUTH). The specific error messages E1 through E4 are sent as indicated in the figure which cause retransmittals of the various messages as indicated. In the authorization operation, these errors indicate either a malfunction within the binary counters (BC) in one of the units or an attempt by someone in the system to send a false or stale message.

If, however, the C1 match fails as required of the test in block 13 of User A's Terminal it is presumed that there is either a transient or permanent error somewhere in the transmission system or within the Vault. In the first of these tests, where the errors are different, it may be generally presumed that the error is transient somewhere between User A and User B, the assumption being that retransmission wil ultimately result in the same message being sent. If, however, the transient errors continue, the system must be notified that the problem exists and must be corrected.

The last situation is where the C1 match fails with the same errors. It is presumed here that the failure is somewhere within the Vault circuitry and the Vault management must be notified as well as User B. Since the error was in the Vault it will presumptively result in some error in the original data message sent by User A.

It should be noted, however, that the various error detection and correction procedures set forth concerning the analysis of errors in the message C1, while convenient, are not necessary to the present system.

It should, of course, be clearly understood that the detection of a 'non-authentic' situation is central and vital to the present system as it is this test which apprises User A, User B, or the Vault, that an invalid message has somehow gotten into the system.

The completion of block 20 of User A's flow chart terminates the operation of the system assuming that some uncorrectable message condition has arisen.

This completes the description of the overall operation of the preferred embodiment of the invention disclosed herein. As was stated previously, this description taken in conjunction with the immediately following timing sequence charts for the Vault hardware will enable those skilled in the art to incorporate the disclosed electronic signature verification system in existent communication networks containing appropriate hardware elements or to build de novo specific communication network utilized in the teachings herein.

TIMING SEQUENCE CHART FOR VAULT

| Step Number | | |
|---|---|---|
| 1. | | TEST STATUS MULTIPLEXER LINE $\phi$:<br>IF STATUS = $\phi$, WAIT<br>IF STATUS = 1, CONTINUE TO STEP 2 |
| 2. | | READ MESSAGE INTO MESSAGE STORE: |
| | 2.1 | RESET MESSAGE STORE ADDRESS GENERATOR (MSAG) |
| | 2.2 | READ DATA WORD INTO MESSAGE STORE |
| | 2.3 | INCREMENT MSAG |
| | 2.4 | TEST STATUS MULTIPLEXER LINE 1:<br>IF STATUS = $\phi$, GO TO STEP 2.2<br>IF STATUS = 1, CONTINUE TO STEP 3 |
| 3. | | (IMPLEMENTATION OF THE "CLASSIFY MESSAGE" TEST WILL BE DEPENDENT UPON THE DESIGN OF MESSAGE PROTOCOLS. FOR EXAMPLE, BY DESIGN A SPECIAL CHARACTER PREFIX FOR RE-SEND REQUESTS MAY BE SPECIFIED. THE FIRST CHARACTER MAY BE READ FROM THE MESSAGE STORE AND TESTED TO SEE IF IT IS THE SAID SPECIAL CHARACTER PREFIX RESERVED FOR RE-SEND REQUESTS. IF IT IS, THE FLOW OF CONTROL IS PASSED TO STEP 18. IF IT IS NOT, CONTROL PASSES TO STEP 4.) |
| 4. | | GENERATE $K_X$: |
| | 4.1 | READ KEY K* (FROM REGISTER 1) INTO STEP-CODER UNIT |
| | 4.2 | READ ADDRESS (X) PREFIXED TO CIPHER (STORED IN MESSAGE STORE, LOCATION $\phi$) INTO "DATA" PORT OF STEP-CODER UNIT |
| | 4.3 | SET DES CONTROLS FOR ENCRYPTION |
| | 4.4 | UPON COMPLETION, STORE RESULT ($K_X$) IN REGISTER 2. |
| 5. | | DECIPHER CY: |
| | 5.1 | SET MSAG TO 1 |
| | 5.2 | READ $K_X$ (FROM REGISTER 2) INTO STEP-CODER KEY PORT |
| | 5.3 | SET DES CONTROLS FOR DECRYPTION |
| | 5.4 | READ BLOCK OF CIPHER CY DATA FROM MESSAGE STORE INTO STEP-CODER DATA PORT |
| | 5.5 | DES DECRYPTION OPERATION |
| | 5.6 | STORE RESULT IN MESSAGE STORE (REPEAT STEPS 5.4, 5.5 and 5.6 AS NECESSARY UNTIL ALL OF CIPHER CY HAS BEEN DECRYPTED). (NOTE: COPY OF CIPHER CY IS RETAINED.) |
| 6. | | CY AUTHENTIC?: |
| | 6.1 | READ BC FIELD OF BLOCK BLX FROM MESSAGE STORE INTO LEFT REGISTER OF COMPARATOR |
| | 6.2 | TEST STATUS MULTIPLEXER LINE 2:<br>IF STATUS = 1, CONTINUE TO STEP 7<br>IF STATUS = $\phi$, GO TO STEP 19. |
| 7. | | IS USER X THE RECEIVER?: |
| | 7.1 | READ X FROM LOCATION $\phi$ OF MESSAGE STORE INTO LEFT REGISTER OF COMPARATOR |
| | 7.2 | READ FROM BLX IN MESSAGE STORE THE RECEIVER ADDRESS (THAT IS, THE "B" IN A/B⊕D⊕BC) INTO THE RIGHT-HAND REGISTER OF THE COMPARATOR |
| | 7.3 | TEST STATUS MULTIPLEXER LINE 2: |

-continued

TIMING SEQUENCE CHART FOR VAULT

| Step Number | | |
|---|---|---|
| | | IF STATUS = 0, CONTINUE TO STEP 8 |
| | | IF STATUS = 1, GO TO STEP 13 |
| 8. | | FORM BLOCK BL3: |
| | 8.1 | CATENATE: STRING D, FOLLOWED BY CATENATION OF CURRENT VALUE OF BC (IN VAULT), FOLLOWED BY CATENATION OF STRING C1, FOLLOWED BY CATENATION OF A/B (ADDRESSES OF SENDER AND RECEIVER, RESPECTIVELY). BLOCK BL3 IS ASSEMBLED IN MESSAGE STORE (IN ALLOCATED SPACE THEREIN) AND SCRATCH SPACES IN COPY STORE ARE UTILIZED AS TEMPORARY STORAGE SPACES DURING THE FORMATION OF BL3. |
| 9. | | GENERATE $K_B$: |
| | 9.1 | READ KEY K* (FROM REGISTER 1) INTO KEY PORT OF DES UNIT |
| | 9.2 | READ FROM BLX IN MESSAGE STORE THE RECEIVER ADDRESS (B) INTO DATA INPUT PORT OF DES UNIT |
| | 9.3 | SET DES CONTROLS FOR ENCRYPTION |
| | 9.4 | DES ENCRYPTION PROCESS |
| | 9.5 | UPON COMPLETION, STORE RESULT ($K_B$) IN REGISTER 2. |
| 10. | | PREPARE STEP-CIPHER ST1: |
| | 10.1 | READ KEY $K_B$ (FROM REGISTER 2) INTO STEP-CODER KEY PORT |
| | 10.2 | SET MULTIPLEXER TO LINK MAIN BUS TO STEP-CODER DATA INPUT PORT |
| | 10.3 | SET DES CONTROLS FOR ENCRYPTION |
| | 10.4 | LOAD 8 BYTES OF BL3 DATA INTO DES DATA INPUT PORT |
| | 10.5 | DES ENCRYPTION OPERATION |
| | 10.6 | UNLOAD 7 BYTES OF PROCESSED DATA FROM DES DATA OUTPUT PORT TO COPY STORE SPACE ALLOCATED FOR ST1. |
| | 10.7 | UNLOAD 8TH BYTE OF PROCESSED DATA FROM DES DATA OUTPUT PORT INTO REGISTER 3 |
| | 10.8 | SET MULTIPLEXER TO LINK REGISTER 3 TO DES DATA INPUT PORT |
| | 10.9 | READ DATA BYTE FROM REGISTER 3 INTO DES DATA INPUT PORT |
| | 10.10 | SET MULTIPLEXER TO LINK MAIN BUS TO DES DATA INPUT PORT |
| | 10.11 | READ NEXT 7 BYTES OF BL3 INTO DES DATA INPUT PORT (REPEAT STEPS 10.5 TO 10.11 AS NECESSARY UNTIL ALL OF BLOCK BL3 HAS BEEN PROCESSED INTO STEP CIPHER ST1). |
| 11. | | SAVE COPY OF STEP CIPHER ST1: |
| | 11.1 | COPY STORE MEMORY CONTROLS ARE SET TO INHIBIT WRITING IN ALLOCATED ST1 MEMORY SPACE |
| 12. | | SEND STEP-CIPHER: (USER B ← ST1) |
| | 12.1 | COPY OF ST1 IS READ FROM COPY STORE TO DATA COMMUNICATION NETWORK VIA MAIN BUS. (APPROPRIATE DATA COMMUNICATION PROTOCOLS ARE ADHERED TO BY VAULT CONTROL UNIT VIA CONTROL SEQUENCES STORED IN VAULT CONTROL MEMORY) |
| | 12.2 | GO TO STEP 1. |
| 13. | | FORM BLOCK BL6: |
| | 13.1 | CATENATE: CURRENT VALUE OF BC (IN VAULT), FOLLOWED BY CATENATION OF CIPHER C1 (FROM MESSAGE STORE), FOLLOWED BY CATENATION OF CIPHER C2. BLOCK BL6 IS ASSEMBLED IN MESSAGE STORE IN MEMORY SPACE ALLOCATED FOR BL3/BL6. |
| 14. | | GENERATE $K_A$: |
| | 14.1 | READ KEY K* (FROM REGISTER 1) INTO KEY PORT OF DES UNIT |
| | 14.2 | READ FROM BLX (IN MESSAGE STORE) THE SENDER ADDRESS (A) INTO THE DATA INPUT PORT OF DES UNIT |
| | 14.3 | SET DES CONTROLS FOR ENCRYPTION |
| | 14.4 | DES ENCRYPTION PROCESS |
| | 14.5 | UPON COMPLETION, STORE RESULT ($K_A$) IN REGISTER 2. |
| 15. | | PREPARE STEP-CIPHER ST2: |
| | 15.1 | READ KEY $K_A$ (FROM REGISTER 2) INTO STEP-CODER KEY PORT |
| | 15.2 | SET MULTIPLEXER TO LINK MAIN BUS TO |

TIMING SEQUENCE CHART FOR VAULT -continued

| Step Number | | |
|---|---|---|
| | | STEP-CODER DATA INPUT PORT |
| | 15.3 | SET DES CONTROLS FOR ENCRYPTION |
| | 15.4 | LOAD 8 BYTES OF BL6 DATA INTO DES DATA INPUT PORT |
| | 15.5 | DES ENCRYPTION OPERATION |
| | 15.6 | UNLOAD 7 BYTES OF PROCESSED DATA FROM DES DATA OUTPUT PORT TO COPY STORE SPACE ALLOCATED FOR ST2 |
| | 15.7 | UNLOAD 8TH BYTE OF PROCESSED DATA FROM DES DATA OUTPUT PORT INTO REGISTER 3 |
| | 15.8 | SET MULTIPLEXER TO LINK REGISTER 3 INTO DES DATA INPUT PORT |
| | 15.9 | READ DATA BYTE FROM REGISTER 3 INTO DES DATA INPUT PORT |
| | 15.10 | SET MULTIPLEXER TO LINK MAIN BUS TO DES DATA INPUT PORT |
| | 15.11 | READ NEXT 7 BYTES OF BL6 INTO DES DATA INPUT PORT (REPEAT STEPS 15.5 TO 15.11 AS NECESSARY UNTIL ALL OF BLOCK BL6 HAS BEEN PROCESSED INTO STEP-CIPHER ST2). |
| 16. | | SAVE COPY OF STEP-CIPHER ST2: |
| | 16.1 | COPY STORE MEMORY CONTROLS ARE SET TO INHIBIT WRITING IN ALLOCATED ST2 MEMORY SPACE. |
| 17. | | SEND STEP-CIPHER: (USER A ← ST2) |
| | 17.1 | COPY OF ST2 IS READ FROM COPY STORE TO DATA COMMUNICATION NETWORK VIA MAIN BUS. (APPROPRIATE DATA COMMUNICATION PROTOCOLS ARE ADHERED TO BY VAULT CONTROL UNIT VIA CONTROL SEQUENCES STORED IN VAULT CONTROL MEMORY) |
| | 17.2 | GO TO STEP 1 |
| 18. | | RESEND REQUESTED STEP-CIPHER: |
| | 18.1 | EVALUATE "RE-SEND REQUEST" MESSAGE FOR ADDRESS OF REQUESTOR (A, OR B) |
| | 18.2 | DETERMINE IF REQUESTOR IS USER A OR USER B BY USING COMPARATOR AND STATUS CONDITION TESTING FACILITIES. (A/B RESIDES IN BL3 MEMORY SPACE AT END OF BL3 STRING. "A" COULD BE USED AS ONE COMPARAND AND THE ADDRESS OF THE (RESEND) REQUESTOR AS THE SECOND COMPARAND. IF THE COMPARISON IS TRUE, I.E., STATUS MULTIPLEXER LINE 2 IS EQUAL TO 1, THEN THE REQUEST IS FROM USER A AND THE VAULT CONTROL UNIT WILL (RE)SEND STEP CIPHER ST2. IF THE TEST IS FALSE, ST1 WILL BE RESENT TO USER B. |
| | 18.3 | GO TO STEP 1 |
| 19. | | REQUEST USER X RESEND X⊕CY: |
| | 19.1 | FORWARD RESEND REQUEST TO USER X (IDENTITY ESTABLISHED IN THE MANNER DESCRIBED IN STEP 18 ABOVE) IN ACCORDANCE WITH THE ESTABLISHED MESSAGE PROTOCOLS |

Industrial Applicability

The uses of the herein disclosed electronic signature verification and message authentication system in the modern day business environment could be manifold. As has been reiterated herein, the system assures virtually a foolproof method of guaranteeing both the identity of the sender and the content of a message insofar as a receiver is concerned, while at the same time guaranteeing the integrity or data content of the received message to the original sender. This allows the utilization of long distance telecommunications facilities for the real time completion of transactions which could only be performed in the past utilizing much more time consuming and conventional methods, such as electronic mail (i.e., facsimile) or by actually having people meet to consummate various transactions.

Thus for example, legally binding contracts could be effected by having both parties to the contract send an additional data or message portion to the other, each having his own unique signature appended thereto, plus each party to the transaction would have his own resident copy of the contract, electronically signed by the other party and wherein the actural wording of the contract would be verifiable at any time in the future, if, for example, a conflict arose and allegations were made that the wordings were at variance.

Similarly, long distance highly verifiable purchase orders could be made between individuals where, due to the nature of the transaction, or the amount of money involved, the receiver of such a message would not normally act unitl both the identity of the sender as well as the content of the message were irrevocably established.

The system could also have applicability for such a commercial purpose as telephone ordering (i.e., local terminal) by an individual from a large, centrally located store, wherein both ordering and funds transfer could be handled in a highly reliable manner utilizing various aspects of the presently disclosed system.

In short, any area where the identity of the participants and the actual content of the transmitted message must both be firmly established would be possible candidates for use of the present invention.

In summary, the present ESV system, prevents masquerading or any form of data alteration by any party (not having access to the secret keys) even though he has access to eavesdropping equipment over the line. It also prevents the gathering of any useful information via eavesdropping which could be subsequently used to bypass the present security system.

It should also be understood that while the present invention has been specifically set forth and described with reference to a preferred embodiment, it will be readily appreciated by those skilled in the art that many changes in form and detail may be made without departing from the spirit and scope of the present invention as set forth in the appended claims.

Having thus described our invention, what we claim as new, and desire to secure by Letters Patent is:

1. A method for effecting a high security electronic signature verification operation in a computer based communication system comprising a central data communication network controller which includes a high security verify unit (Vault) therein said system further including at least two remotely located terminals selectively connectable to said Vault over said data communication network and wherein said Vault and each of said terminals includes substantially identical key-controlled block-cipher cryptographic devices included therein and wherein said Vault has available therein means for obtaining the individual keys $K_X$ of each terminal (or user X) connected to said system, said method comprising:

User A (sender) at a first terminal sending the Vault a first message (A⊕C1) including a first segment which comprises an identification code of the user A in clear format and a second segment C1 including at least an identification of the sender, user A, the receiver user B (A/B) and the message to be communicated to user B (Data) at a second terminal, said second portion being encrypted under user A's key $K_A$, the Vault upon receipt of said message A⊕C1 obtaining the key $K_A$ based on the first portion of said message A, and decrypting said message portion C1 using key $K_A$, verifying the identity of user A and upon a successful verification of the user A said Vault forming a second message to be sent to user B (receiver) at said second terminal, said second message including the message segment C1 from the first message and a new message segment comprising the identity A/B of the sender and receiver and Data which message is encrypted as a function of user B's key $K_B$, user B upon receipt of said second message from the Vault decoding same and saving the message C1 in a 'Legal Store', and forming a third message B⊕C2 to be returned to the Vault said third message including the identity of user B in clear format as a first segment and a second segment C2 comprising at least the previous message segment C1 and the identity A/B of the sender and receiver, enciphering this second message segment under key $K_B$, and sending the message B⊕C2 to the Vault, the Vault upon receipt of the message from the user B decrypting the message C2 to obtain segment C1 therefrom, said Vault then forming a fourth message C1⊕C2 and encrypting said message as a function of user A's key $K_A$ and sending said message to user A, user A upon receipt of said fourth message from the Vault decrypting the message to obtain C1 and C2, and storing C2 in a 'Legal Store'.

2. An electronic signature verification method as set forth in claim 1 wherein said Vault and all terminals connected to the system each contain synchronized binary counters, said verification operation including encrypting the current value of the local binary counter (BC) of the sending station encrypted under key $K_A$ for messages 1 and 4 and under key $K_B$ for messages 2 and 3, the Vault and both users first comparing the received binary counter values included in all of the received messages with a current local count value before accepting any message as authentic.

3. An electronic signature verification method as set forth in claim 1, including encoding and transmitting the second message from the Vault to user B and the fourth message from the Vault back to user A as step code functions of the keys $K_B$ and $K_A$ respectively.

4. An electronic user verification method as set forth in claim 1 including user A storing the message segment C1 in a memo file concurrently with transmitting the first message to the Vault and subsequent to decoding the fourth message received from the Vault, and comparing the value of said message segment C1 contained therein for conformity with the message C1 stored in user A's memo file.

5. An electronic signature verification method as set forth in claim 1 including the Vault constructing the individual user keys $K_X$ as a cryptographic function of the identity code of the user X encrypted under a system master key ($K^*$) such that $K_X = \pi(K^*, X)$.

6. A high security electronic signature verification system for use in a computer based communication facility comprising a central data communication network controller which includes a high security verify unit (Vault) therein said system further including at least two remotely located terminals selectively connectable to said Vault over said data communication network and wherein said Vault and each of said terminals includes substantially identical key-controlled blockcipher cryptographic devices included therein and wherein said Vault has available therein means for obtaining the individual keys $K_X$ of each terminal (or user X) connected to said system.

means at a first terminal to enable a user A (sender) to send the Vault a first message (A⊕C1) comprising a first segment which comprises an identification code for the user A in clear format and a second segment C1 including at least an identification of the sender, user A, the receiver user B (A/B) and the message to be communicated to user B (Data), means for encrypting said second portion under user A's key $K_A$, means in the Vault operable upon receipt of said message A⊕C1 for obtaining the key $K_A$ based on the first segment, A, of said message and means for decrypting said message portion C1, under key $K_A$ verifying the identity of user A and upon a successful verification of the user A means operable to form a second message to be sent to user B (receiver) at a second terminal including the message segment C1 from the message and a new message segment including at least A/B and Data which message is encrypted as a function of user B's key $K_B$, means at said second terminal operable upon receipt of said second message from the Vault for decoding same and saving the message C1 in a 'Legal Store', and forming a third message to be returned to the Vault said third message including the identity of user B in clear format as a first segment and a second segment C2 comprising at least the previous message segment C1 and the identity A/B of the sender and receiver, enciphering this second message segment under key $K_B$, and sending the message B⊕C2 to the Vault, means at the Vault operable upon receipt of the message from the second terminal (user B) for decrypting the message C2 to obtain segment C1 therefrom, further means operable for forming a fourth message C1⊕C2 and for encrypting said message as a function of user A's key $K_A$ and for sending said message to said first terminal, said first terminal including means operable upon receipt of said fourth message from the Vault for decrypting the message to obtain C1 and C2, and storing C2 in a 'Legal Store'.

7. An electronic signature verification system as set forth in claim 6 wherein said Vault and all terminals connected to the system each include synchronized binary counters, and means operable during said verification operation for encrypting the current value of the local binary counter (BC) of the sending station encrypted under key $K_A$ for messages 1 and 4 and under key $K_B$ for messages 2 and 3, the Vault and both terminals further including means for first comparing the received binary counter values included in all of the received messages with a current local count value before accepting any message as authentic.

8. An electronic signature verification system as set forth in claim 6, including means for encoding and transmitting the second message from the Vault to user B and the fourth message from the Vault back to user A as step code functions of the keys $K_B$ and $K_A$ respectively.

9. An electronic user verification method as set forth in claim 6 including means in said first terminal for storing the message segment C1 in a memo file concurrently with transmitting the first message to the Vault and means operable after decoding said fourth message received from the Vault for comparing the message segment C1 thereof for conformity with the message C1 stored in user A's memo file.

10. An electronic signature verification method as set forth in claim 6 further including means in the Vault for constructing the individual user keys $K_X$ as a cryptographic function of the identity code of the user X encrypted under a system master key (K*) such that $K_X = \pi(K^*, X)$.

11. A method for effecting a high security electronic signature verification operation in a computer based communication system comprising a central data communication network controller which includes a high security verify unit (Vault) therein said system further including at least two remotely located terminals selectively connectable to said Vault over said data communication network and wherein said Vault and each of said terminals connected to said system includes substantially identical key-controlled block-cipher cryptographic devices included therein and wherein said Vault has available therein means for obtaining the individual Keys $K_X$ of each terminal (or user X) connected to said system, and wherein said Vault and all terminals connected to the system each contain synchronized binary counters said method comprising:

User A (sender) at a first terminal sending the Vault a first message (A ⊕ C1) including a first segment which comprises an identification code of the user A in clear format and a second segment C1 including at least an identification of the sender, user A, the receiver user B (A/B) the current value BC1 of the counter resident in user A's terminal and the message to be communicated to user B (Data) at a second terminal, said second portion being encrypted under user A's key $K_A$, the Vault upon receipt of said message A ⊕ C1 obtaining the key $K_A$ based on the first portion of said message A, and decrypting said message portion C1 using key $K_A$, verifying the identity of user A and verifying the decoded counter value BC1 by comparing with its own counter value and upon a successful verification of the user A and the counter value said Vault forming a second message to be sent to user B (receiver) at said second terminal, said second message including the message segment C1 from the first message and a new message segment comprising the identity A/B of the sender and receiver the Vault's current counter value and Data which message is encrypted as a function of user B's key $K_B$, user B upon receipt of said second message from the Vault decoding same and saving the message C1 in a 'Legal Store', verifying the decoded counter value BC2 by comparing with his terminal's counter value and forming a third message B ⊕ C2 to be returned to the Vault said third message including the identity of user B in clear format as a first segment and a second segment C2 comprising at least the previous message segment C1, the terminals current counter value BC3 and the identity A/B of the sender and receiver, enciphering this second message segment under key $K_B$, and sending the message B ⊕ C2 to the Vault, the Vault upon receipt of the message from the user B decrypting the message C2 to obtain segment C1 therefrom and verifying the decoded counter value BC3 with its own counter value, said Vault then forming a fourth message C1 ⊕ C2 ⊕ BC4 where BC4 is the Vault's current counter value and encrypting said message as a function of user A's key $K_A$ and sending said message to user A, user A upon receipt of said fourth message from the Vault decrypting the message to obtain C1 and C2 verifying the decoded counter value with its own counter value, and storing C2 in a 'Legal Store'.

12. An electronic user verification method as set forth in claim 11 including user A storing the message segment C1 in a memo file concurrently with transmitting the first message to the Vault and subsequent to decoding the fourth message received from the Vault, comparing the value of said message segment C1 contained therein for conformity with the message C1 stored in user A's memo file.

13. A high security electronic signature verification system for use in a computer based communication facility comprising a central data communication network controller which includes a high security verify unit (Vault) therein said system further including at least two remotely located terminals selectively connectable to said Vault over said data communication network and wherein said Vualt and each of said terminals connected to said system includes substantially identical key-controlled block-cipher crytographic devices included therein and wherein said Vault has available therein means for obtaining the individual keys $K_X$ of each terminal (or user X) connected to said system, and wherein said Vault and all terminals connected to the system each contain synchronized binary counters said system comprising:

means at a first terminal (sender) for enabling User A to send the Vault a first message A $\oplus$ C1) including a first segment which comprises an identification code of the user A in clear format and a second segment C1 including at least an identification of the sender, user A, the receiver user B (A/B) the current value (BC1) of the counter resident in user A's terminal and the message to be communicated to user B (Data) at a second terminal, said second portion being encrypted under user A's key $K_A$, means in the Vault operative on receipt of said message A $\oplus$ C1 for obtaining the key $K_A$ based on the first portion of said message A, and means for decrypting said message portion C1 using said key $K_A$, means for verifying the identity of user A and for verifying the decoded counter value BC1 by comparing it with its own counter value and means operable upon a successful verification of the user A and the counter value for forming a second message to be sent to user B (receiver) at said second terminal, said second message including the message segment C1 from the first message and a new message segment comprising the identity A/B of the sender and receiver the Vault's current counter value and Data and means for encrypting said second message as a function of user B's key $K_B$, means in user B's terminal operable upon receipt of said second message from the Vault for decoding same and saving the message C1 in a 'Legal Store', means for verifying the decoded counter value BC2 by comparing it with the terminal's current counter value and means for forming a third message B $\oplus$ C2 to be returned to the Vault said third message including the identity of user B in clear format as a first segment and a second segment C2 comprising at least the previous message segment C1, the terminal's current counter value BC3 and the identity A/B of the sender and receiver, and means for enciphering the second message segment under key $K_B$, and sending the message B $\oplus$ C2 to the Vault, means in the Vault operable on receipt of the third message from the user B for decrypting the message C2 to obtain segment C1 therefrom and means for verifying the decoded counter value BC3 against its own counter value, means for forming a fourth message C1 $\oplus$ C2 $\oplus$ BC4 where BC4 is the Vault's current counter value and for encrypting said fourth message as a function of user A's key $K_A$ and sending said message to user A, means in user A's terminal operable on receipt of said fourth message from the Vault for decrypting the message to obtain C1 and C2, verifying the decoded counter value with its own counter value, and for storing C2 in a 'Legal Store'.

14. An electronic user verification method as set forth in claim 13 including storage means in user A's terminal for storing the message segment C1 in a 'memo' file concurrently with transmitting the first message to the Vault and further means operable subsequent to the decoding of the fourth message received from the Vault for accessing the 'memo' file and comparing the value of said message segment C1 contained therein for conformity with the message segment C1 contained in said fourth message.

* * * * *